US012098026B2

(12) United States Patent
Li et al.

(10) Patent No.: US 12,098,026 B2
(45) Date of Patent: Sep. 24, 2024

(54) LOW PROFILE TRANSFER MECHANISM FOR CONTROLLED ENVIRONMENT

(71) Applicant: RUTGERS, THE STATE UNIVERSITY OF NEW JERSEY, New Brunswick, NJ (US)

(72) Inventors: Guohong Li, Highland Park, NJ (US); Eva Y. Andrei, Highland Park, NJ (US); Angela Coe, Tenstrike, MN (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 937 days.

(21) Appl. No.: 15/733,768

(22) PCT Filed: Apr. 17, 2019

(86) PCT No.: PCT/US2019/027929
§ 371 (c)(1),
(2) Date: Oct. 20, 2020

(87) PCT Pub. No.: WO2019/209592
PCT Pub. Date: Oct. 31, 2019

(65) Prior Publication Data
US 2021/0237972 A1    Aug. 5, 2021

Related U.S. Application Data

(60) Provisional application No. 62/661,924, filed on Apr. 24, 2018.

(51) Int. Cl.
*B65G 1/00* (2006.01)
*B65G 1/04* (2006.01)
(Continued)

(52) U.S. Cl.
CPC .......... *B65G 1/0464* (2013.01); *B65G 1/045* (2013.01); *B66C 1/24* (2013.01); *F16M 13/02* (2013.01); *B66D 1/26* (2013.01)

(58) Field of Classification Search
CPC ...... B65G 1/0464; B65G 1/045; F16M 13/02; B66C 1/24; B66C 17/12
See application file for complete search history.

(56) References Cited

U.S. PATENT DOCUMENTS 3,043,444 A * 7/1962 Melton .................... B66D 1/39
212/331
3,805,967 A   4/1974 Scannell
(Continued)

FOREIGN PATENT DOCUMENTS

EP    3670389 A1 * 6/2020 ............... B65G 1/04
FR    2550984 A1   3/1985
WO   WO-2021175953 A1 * 9/2021 ............... B65G 1/04

OTHER PUBLICATIONS

Folkman, et al. Presentation: High and Ultra High Volume Systems.
(Continued)

*Primary Examiner* — Emmanuel M Marcelo
(74) *Attorney, Agent, or Firm* — Wolter Van Dyke Davis, PLLC; Eugene J. Molinelli; Patrick D. Herron

(57) ABSTRACT

A system for transferring objects into a device inside a controlled environment includes a winch, tool and carousel. The winch includes a drum, and wire arrangement configured to be reversibly wound onto the drum by a first drive. The tool is suspended below a distal end of the wire arrangement and configured to suspend an object. Both the tool and the object are sized to fit inside a device located below the winch. The carousel is connected to a second drive configured to rotate the carousel around a vertical axis, and includes a storage space centered at a first horizontal angle and a pass-through opening at a different second horizontal (Continued)

angle. The pass-through opening being large enough to pass the tool and the object as the wire arrangement is unwound from the drum thereby lowering the tool and object inside the device.

8 Claims, 33 Drawing Sheets

(51) Int. Cl.
    *B66C 1/24* (2006.01)
    *F16M 13/02* (2006.01)
    *B66D 1/26* (2006.01)

(56) References Cited

U.S. PATENT DOCUMENTS

| | | | | |
|---|---|---|---|---|
| 5,423,438 | A * | 6/1995 | Swanson | B66D 1/38 254/281 |
| 9,016,486 | B2 * | 4/2015 | Noll | B66D 1/26 212/312 |
| 10,418,263 | B2 * | 9/2019 | Kesil | H01L 21/67733 |
| 2004/0026349 | A1 | 2/2004 | Colgate | |
| 2019/0229003 | A1 * | 7/2019 | Kesil | H01L 21/67712 |

OTHER PUBLICATIONS

PI USA. Vacuum Precision Positioning Stages & Actuators. UHV Stages—Linear & Rotary Motorized Positioners for Vacuum, wide Temperature, http://www.pi-usa.us/products/precision_positioning_pi-micos/Vacuum_Precision_Positioning_Stages_Mc.php [Accessed Mar. 8, 2018 6:02:49 PM].

Physik Instrumente. HV and UHV Positioning Systems. Vacuum Compatible Linear & Rotary Stages, UHV Positioners. https://www.physikinstrumente.com/en/technology/vacuum/ [Accessed Mar. 8, 2018 6:04:19 PM].

Wikipedia Ultra-high vacuum https://en.wikipedia.org/wiki/Ultra-high_vacuum [Accessed Mar. 8, 2018 5:59:37 PM] 2018.

International Search Report and Written Opinion for International Patent Application No. PCT/US19/27929 dated Oct. 24, 2019, pp. 1-9.

* cited by examiner

LOW PROFILE TRANSFER MECHANISM FOR CONTROLLED ENVIRONMENT

STATEMENT OF GOVERNMENTAL INTEREST

This invention was made with government support under Grant No. 1337871 awarded by the National Science Foundation. The government has certain rights in the invention.

BACKGROUND

Operations, such as scientific experiments or manufacturing, are often carried out in special controlled environments (such as ultra high vacuum, ultra clean, toxic gas, high radiation or high pressure, among others) that require special chambers to contain those environments. The special chamber is typically constructed by properly sealing together multiple chamber portions, each with one or more openings or ports, sealing any unused ports. It is often expensive and time consuming to bring the inside of the special chamber composed of such sections to the desired controlled environment, with total time and expense increasing with increased volume inside the special chamber. Typically, there is a device (such as a superconducting magnet or cryostat or both) inside the chamber, back and forth from which multiple objects must be transferred during various operations. This device often dictates or restricts the size of the chamber to be used. To avoid having to open the chamber or replace chamber sections repeatedly and then bring the inside of the resulting chamber back to the desired controlled environment, it is often the practice that multiple objects are placed inside the chamber with a transfer mechanism also inside the chamber to move the objects back and forth into the device inside the chamber. To accommodate the forces to move a variety of objects, the transfer mechanism is typically rigid. In order to transfer objects into and out of the device, the rigid transfer mechanism often has a size that is on the order of the device, or larger. As a consequence, the chamber is composed of enough sections to accommodate space for the transfer mechanism as well as the device and objects, increasing the time and expense to bring the inside of the many chamber sections to the controlled environment.

SUMMARY

It is noted here that space inside a special chamber can be reduced, thus reducing the time and cost of bringing the inside of the special chamber to the special environment, if a low profile transfer mechanism is used that is smaller than a size of the device into and out of which objects are to be transferred.

In a first set of embodiments, a system for transferring objects into a device inside a controlled environment includes: winch, including a drum; and wire arrangement configured to be reversibly wound onto the drum by a first drive. The system also includes a tool suspended below a distal end of the wire arrangement and configured to suspend an object therefrom. Both the tool and the object are sized to fit inside a portion of the controlled environment disposed inside a device located below the winch. In some embodiments of this set, the system also includes a carousel disposed in the controlled environment and connected to a second drive configured to rotate the carousel around a vertical axis. The carousel includes a storage space centered at a first horizontal angle and a pass-through opening at a different second horizontal angle. The pass-through opening is large enough to pass the tool and the object suspended from the wire arrangement therethrough as the wire arrangement is unwound from the drum, and the tool and the object are thereby lowered under the influence of gravity into the portion of the controlled environment disposed inside the device.

In a second set of embodiments, a tool apparatus includes a housing; a handle at a top end of a housing; a central passage through the housing and the handle; and a floating element configured to move along an axis in the central passage through a range of positions bounded by an upper position and a lower position and including a neutral position. The apparatus also includes a flip-flop linkage that includes a sliding block constrained to move perpendicular to the axis and a coupler connected to the sliding block and to the floating element. When the floating element is in the lower position, the coupler positions the sliding block at a first perpendicular distance from the housing. When the floating element is in the upper position, the coupler positions the sliding block at a different second perpendicular distance from the housing and the floating element protrudes through the handle. When in the neutral position, the coupler positions the sliding block at a maximum perpendicular distance from the housing. The apparatus also includes a spring configured to bias the sliding block toward the housing and thereby, via the coupler, bias the floating element away from the neutral position. The apparatus also includes a hook secured to the sliding block and configured to suspend an object therefrom.

In some dropoff tool embodiments of the second set, the first perpendicular distance is less than the second perpendicular distance. In some pickup tool embodiments of the second set, the first perpendicular distance is greater than the second perpendicular distance.

In a third set of embodiments, a winch coupler apparatus includes a body comprising a groove configured to retain and move along a guide rail; a foot; and a door. The foot is secured to the body and set apart from the body to form a gap therebetween. The foot includes a receiving slot that extends along a first axis transverse to the groove and which comprises a cradle. The cradle extends transverse to the first axis and is configured to receive and prevent lateral movement of a handle comprising a shape that cooperates with a shape of the cradle after the handle is moved laterally into the gap and then lowered and seated into the cradle. A portion of the handle is disposed in the slot during the lateral movement into the gap. The door is disposed in the gap and is configured to selectively move back and forth over the cradle, effective to prevent and permit, respectively, movement into the gap of a handle seated in the cradle.

In a fourth set of embodiments, an object holder apparatus includes a vertical support and a stand plate. The stand plate supported by the vertical support and includes a receiving slot that extends in along an axis transverse to the vertical support. The receiving slot is disposed between horizontal supports that are configured to receive and suspend an object that is moved laterally and lowered onto the horizontal supports. A portion of the object is disposed in the slot during the lateral movement of the object.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
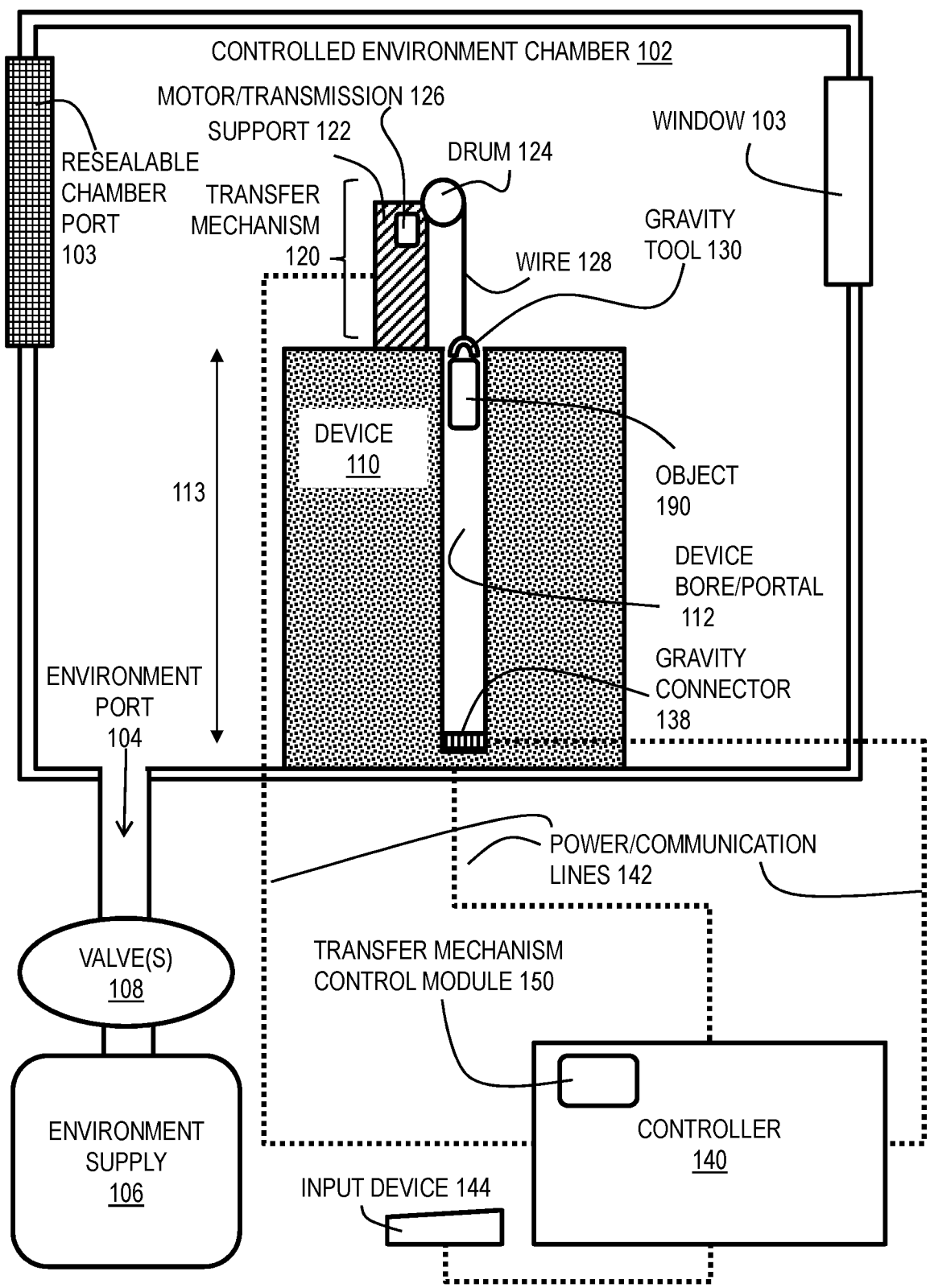
FIG. 1 is a block diagram that illustrates an example transfer mechanism deployed in a controlled environment chamber, according to an embodiment.

A method and apparatus are described for a low-profile transfer mechanism for controlled environments. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of an ultra high vacuum (UHV) environment used with a Scanning Tunneling Microscope (STM) in the bore of a superconducting magnetic that involves a very low temperature cryostat. However, the invention is not limited to this context. The system can be used in non-UHV environments. The objects can be other scanning probe microscopes, such as atomic force microscope or magnetic force microscope etc., or can be any devices for electrical measurements. In other embodiments, a low-profile transfer system is used within other controlled environments for other operations using other devices inside the controlled environment. For example, in some embodiments, the transfer system is used for manufacturing of electronic chips in a particle free (ultra clean) environment using sputtering equipment. In other embodiments, the transfer system may be used to test devices in toxic or infectious environments, or to transfer objects inside chambers containing any liquids.

1. Overview

It was determined that substantial space savings, with commensurate savings in time and expense to produce a controlled environment, would be achieved if a winch system were used under the force of gravity to move objects vertically into a device inside a controlled environment chamber. By rolling the wire onto a drum of the winch, the wire could execute substantial vertical displacements into the device, without a commensurate vertical displacement outside the device, as in the prior art approaches using rigid transfer mechanisms. However, a wire only controls tension forces, so the spatial advantage of using the winch and wire comes hand in hand with the complication that shearing forces transverse to the wire or upward against the wire could not be applied by the wire, thus limiting the forces available to grab or disengage the multiple objects to be deposited inside the device. Thus, in the various embodiments, the winch is partnered with a gravity activated tool to engage and disengage the various objects to be inserted and removed from the device inside the controlled environment. A sufficient mass is included on a distal end of the wire to provide a gravitational force sufficient to operate the gravity activated tool and withstand upward forces, and a commensurate inertial mass sufficient to move little when a small transverse force is encountered. In some embodiments the winch is also paired with a carousel which allows the winch to operate on an array of features organized around the carousel as the carousel rotates with respect to the winch.

FIG. 1 is a block diagram that illustrates an example transfer mechanism 120 deployed in a controlled environment chamber 102, according to an embodiment. The chamber includes one or more ports that provide access to the chamber, such as a resealable chamber port 103 and environment port 104. The resealable chamber port 103 is opened to place objects, devices or other instruments, or some combination, inside the chamber when the environment is not controlled, or to connect to another chamber section. One or more environmental ports 104 are connected through to corresponding valves 108 to corresponding supplies 106 of the controlled environment, such as vacuum pumps to create vacuum environments, gas supplies for a gaseous environment, liquid supply for liquid environments, filters for a clean room environment, radiation sources for a radioactive environment, and so on.

Inside the chamber 102 and subject to the controlled environment is a device 110 that is to operate on one or more objects 190. For example, in various embodiments, the device 110 is a source of radiation or illumination or electrical fields or magnetic fields or very low temperatures or very high temperatures, among others, alone or in some combination. For example, in some embodiments the device 110 includes a superconducting magnet and a cryostat to provide the low temperatures at which superconductivity occurs. Inside the device is space 112, such as a bore or portal, into which one or more objects 190 are to be reversibly inserted. The space 112 has a vertical dimension D 113 that determines a distance the object 190 must be moved inside the device. Prior art devices included a rigid transfer mechanism (not shown) that extended more than D 113 vertically outside the device 100. Thus, the chamber had to be sized to accommodate such a large vertical excursion, with the commensurate time and cost of that size.

In contrast, in various embodiments, a transfer mechanism 120 is used that is less than D 113 in vertical extent. Such a transfer mechanism 120 with a vertical extent less than D 113 is said to be low profile. The advantage of such a mechanism is that the chamber size can be much less than in the prior art, thus saving time and cost in achieving the desired controlled environment.

The transfer mechanism includes a winch that itself includes at least drum 124, wire 128, and a motor or transmission 126 (called a drive hereinafter) configured to rotate the drum around a horizontal axis. The wire is configured to be wound onto the drum as the drum rotates in one direction, and to wind off the drum as the drum rotates in the opposite direction. Thus, a proximal end of the wire is attached to the drum. In some embodiments a motor is enclosed in the transfer mechanism 120 to power the winch. In other embodiments, the motor, such as an electrical motor or manual crank, is outside the chamber 102 and is mechanically connected to the mechanism 120 and drum 124 through one or more seals using a series of linkages, called a transmission, including any non-unitary gear ratios, to transmit the rotational motion. Any such transmission known in the art may be used.

Suspended on a distal end of the wire 128 is a tool 130 configured to reversibly attach under the force of gravity to the object 190. Any method to make the connection under just the force of gravity may be used. Some particular embodiments are described in more detail below with reference to FIG. 11 through FIG. 17. In various embodiments, a mass sufficient to apply any desired force is also suspended on the distal end of the wire, either as part of, or as separate from, the tool 130.

In some embodiments, multiple tools or objects, or both, are used with the device without opening the chamber 102 (e.g., at port 103) or changing the controlled environment through environmental port 104. For example, one tool is used to deposit the object in the space 112 and a separate tool is used to retrieve the object from the space 112. In these embodiments, the multiple tools or objects or both are arranged to be accessed by the wire 128. In some of these embodiments, the multiple objects or tools are arranged on a carousal rotating around a vertical axis so that each tool or object can be moved under the wire 128 as needed. The carousel also has an opening to grant access to the space 112, as described in more detail below with reference to FIG. 2.

Figure 20:
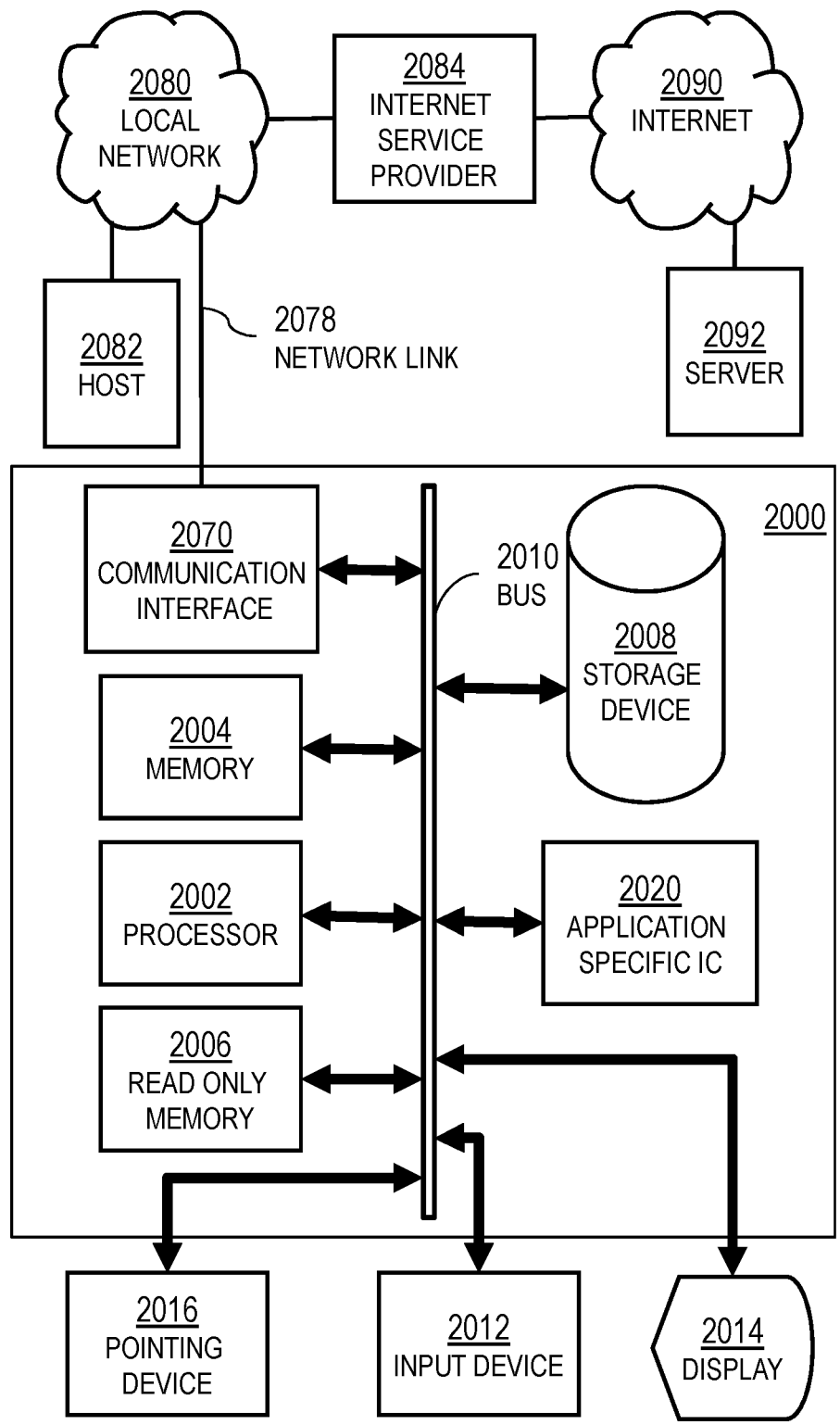
FIG. 20 is a block diagram that illustrates a computer system for a control system which is capable of operating in the system of FIG. 1, according to one embodiment.
Figure 21:
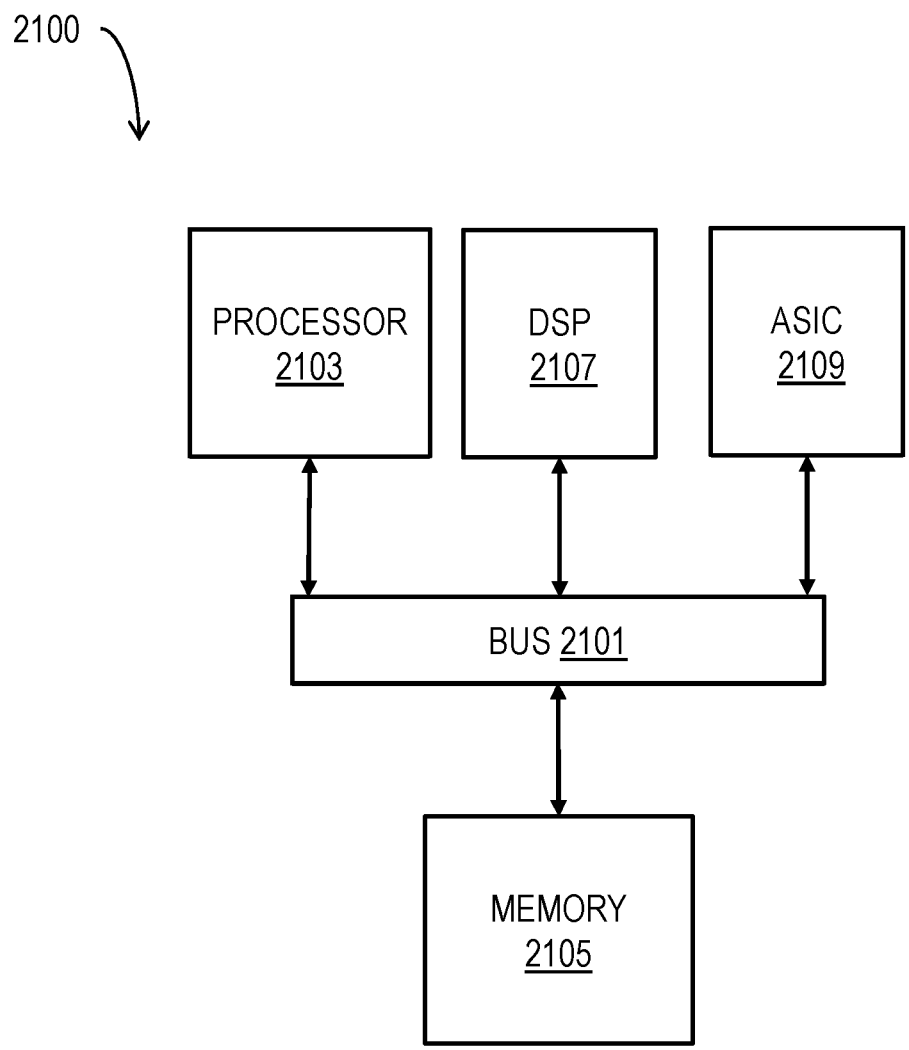
FIG. 21 illustrates a chip set which is capable of operating in the system of FIG. 1, according to an embodiment.
Figure 22:
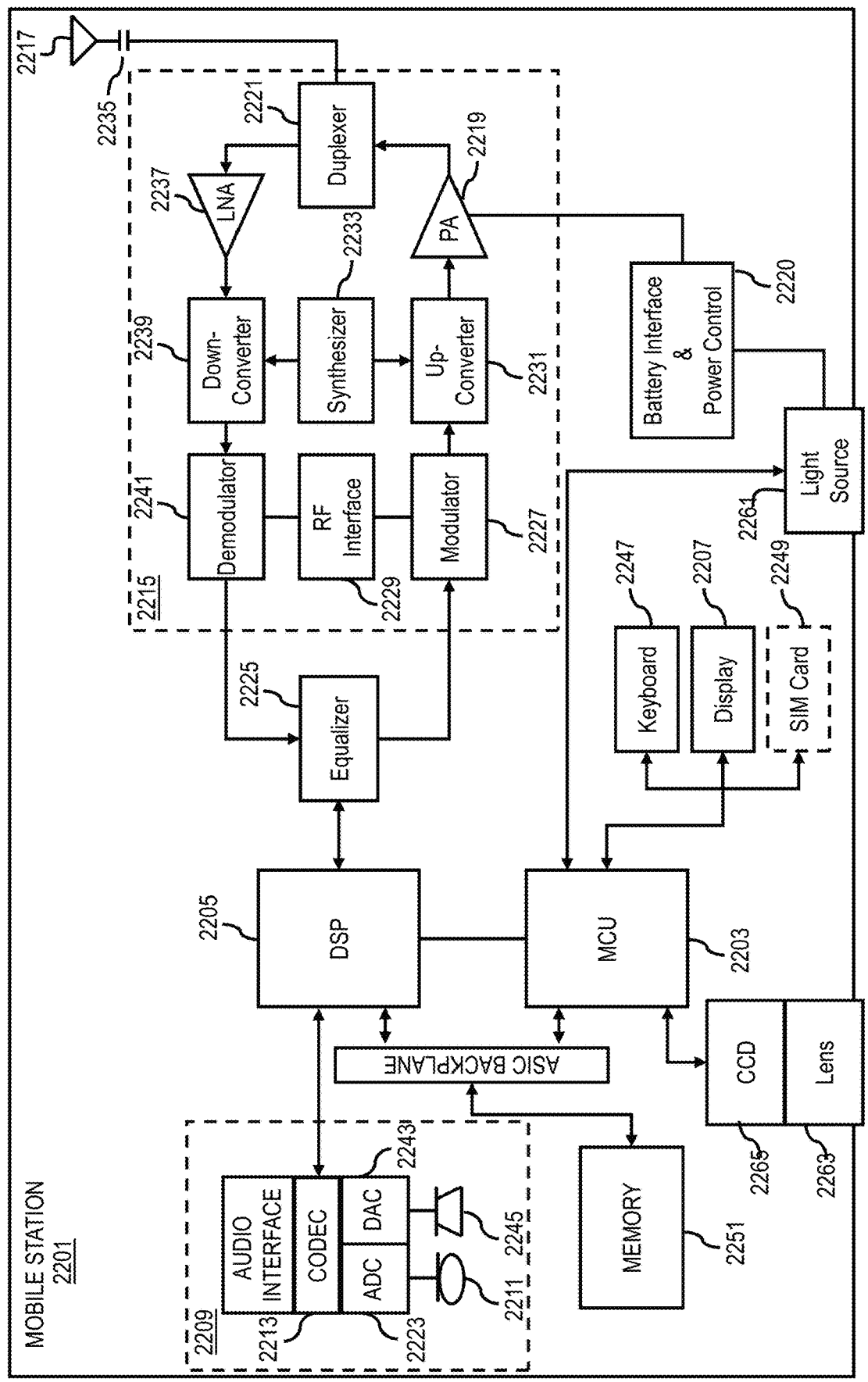
FIG. 22 is a diagram of example components of a mobile terminal (e.g., cell phone handset) for communications, which is capable of operating in the system of FIG. 1, according to an embodiment.

In some embodiments, operation of the chamber 102 (including valves 108 and supply 106) or object 190 or transfer mechanism 120 or some combination is controlled by a processing system, called controller 140 that may be implemented on a computer system as depicted in FIG. 20, or on chip set as depicted in FIG. 21, or on a mobile device as depicted in FIG. 22, or some combination. The control is exercised through one or more wired or wireless power or communication links 142, or some combination. In particular, a transfer mechanism control module 150 is included in controller 140. In some embodiments, transfer mechanism operation is controlled at least in part by user input through user input device 144, such as a keyboard, touchscreen, joystick or pointing device.

In some embodiments, the object 190 receives power and control signals through a wired connection (not shown), so that the wire or wires are inserted in the device 110 attached to the object 190. In some embodiments, the wire or wires for power or control signals, or some combination, are attached instead to a gravity connector 138 for the object. The gravity connector 138 is disposed in the space 112 and configured to connect to the object under the gravitational force provided by the object 190 itself or in conjunction with the mass suspended at the distal end of the wire 128, either in the tool 130 or separately.

The chamber 102 includes a window 103 for viewing the inside of the chamber from the outside, so that an operator can determine what is happening inside the chamber 102, including observing the operation of transfer mechanism 120. In some embodiments, the window is replaced by one or more optical detectors inside the chamber that communicate detector data, e.g., as image or video data, to a viewer outside the chamber, such as using a display device 2014 connected to computer system 2000.

Although processors, processes and equipment are depicted in FIG. 1 as integral blocks in a particular arrangement for purposes of illustration, in other embodiments one or more processors, processes or equipment, or portions thereof, are arranged in a different manner, on the same or different equipment, or are omitted, or one or more different processes or equipment are included.

Figure 2:
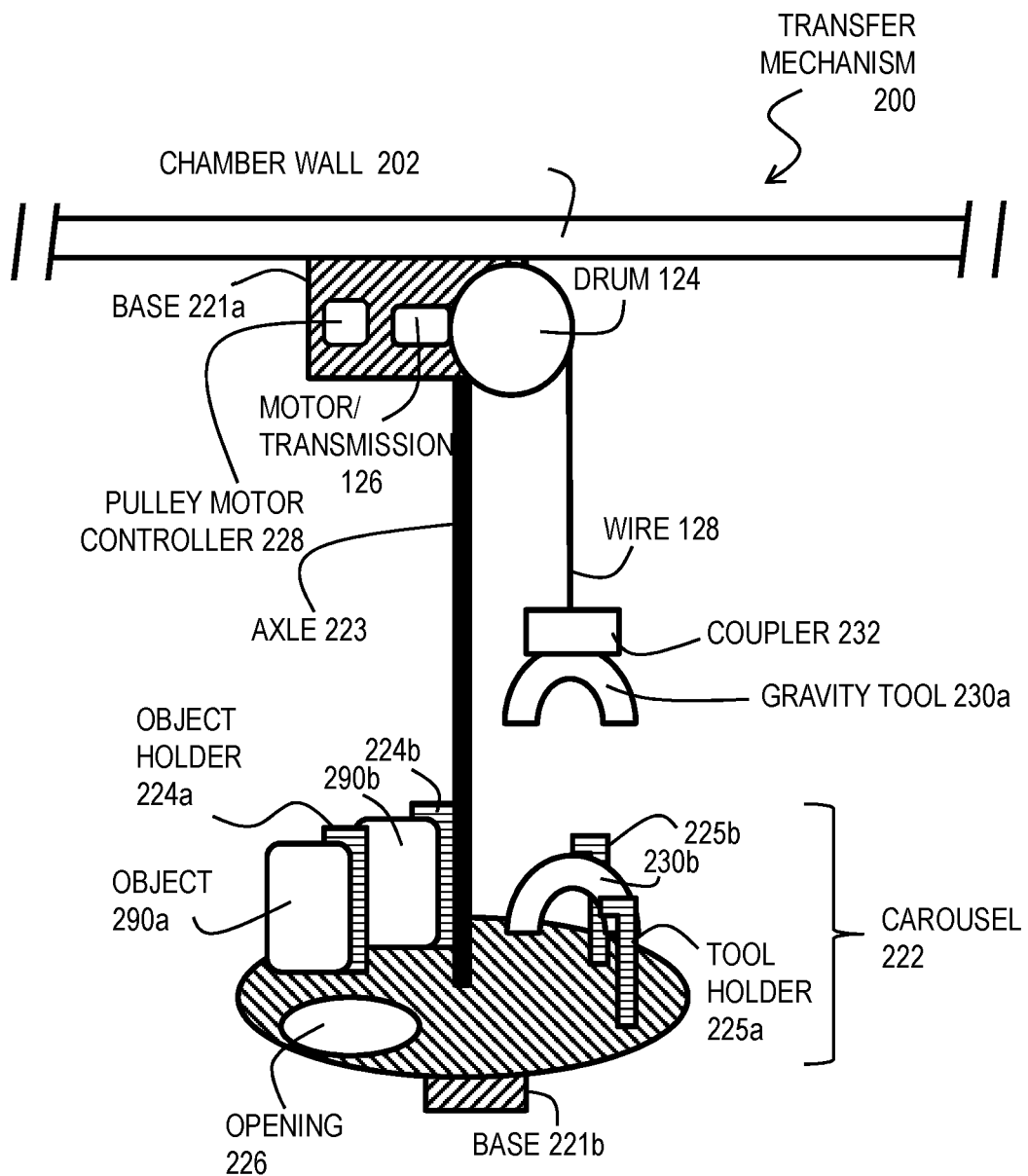
FIG. 2 is a block diagram that illustrates an example transfer mechanism with multiple objects to be transferred or multiple tools therefor, according to an embodiment.

FIG. 2 is a block diagram that illustrates an example transfer mechanism 200 with multiple objects to be transferred or multiple tools therefor, according to an embodiment. Although chamber wall 202 and objects 290a. 290b (the latter collectively referenced hereinafter as objects 290) are depicted for purposes of illustration, they are not part of mechanism 200. The mechanism 120 includes a support structure made up of base 221a or base 221b or both (collectively referenced hereinafter as support structure 221). Base 221a is configured to be fixed to chamber wall 202. Base 221b is configured to be fixed to a different wall or to device 110.

A winch comprising drum 124 and motor/transmission 126 and wire 128 is affixed to base 221a. The wire 128 is configured to be reversibly wound onto the drum 124. The drum is mechanically connected to motor/transmission 126 as a first drive that is configured to rotate the drum around a horizontal axis (coming out of page) relative to the support structure base 221a. In some embodiments, the drum 124 can be engaged and disengaged from the motor/transmission 126. In this embodiment, attached to the distal end of the wire is a coupler 232 configured to reversibly attach under the force of gravity to any of one or more tools. In some embodiments, the coupler 232 includes enough mass to provide sufficient force to allow the coupled tool to engage or disengage an object or force the object onto its gravity connector 138 or some combination.

The mechanism includes one or more gravity activated tools 230a, 230b, collectively referenced hereinafter as gravity tools 230. Each gravity activated tool 230 is configured to reversibly attach under the force of gravity to an object (290). Both the tool and the object are sized to fit inside device 110 disposed inside the chamber 102. In some embodiments with only one tool 130, the coupler 232 is omitted; and, the one tool 130 is attached to the distal end of the wire 128, as depicted in FIG. 1. In some of these embodiments, the tool 130 includes enough mass to provide sufficient force to allow the tool 130 to engage or disengage an object 290 or force the object 290 onto its gravity connector 138, or some combination.

In some embodiments, involving multiple tools or multiple objects or both, the transfer mechanism includes a carousel 222. The carousel 222 is connected to the support structure and mechanically connected to a second drive configured to rotate the carousel around a vertical axis relative to the support structure (e.g., base 221b or base 221a or both). In the illustrated embodiment, the carousel includes an axel 223 rotatably attached to the base 221a or base 221b or both. The axel 223 thus is aligned with the vertical axis of rotation of the carousel 222. In some embodiments, the second drive is a separate motor or transmission (not shown). In some embodiments, the axel can be engaged and disengaged from the motor/transmission 126 so that the carousel can be rotated independently of the rotation of the drum 124. In some embodiments, a motor controller 228 is included to receive signals from the controller 140 and engage or disengage the drum 124 or axel 223 to independently rotate the drum 124 and carousel 222.

The carousel includes one or more spaces for placing the one or more tools 230 or objects 190, each at a different horizontal angle around the carousel. By rotating the appropriate tool 230 or object 290 on the carousel under the wire 128, the tool 230 or object 290 can encounter the wire with the coupler 232 or tool 230 and thus become suspended from the distal end of the wire. In addition, the carousel includes opening 226 at a still different horizontal angle around the carousel. The opening 226 is large enough to pass the tool 230 and the object 290. When the wire is unwound from the drum and the carousel is rotated to position the opening under the wire, the opening is centered on the wire. The carousel 222 is positioned in the chamber so that when centered on the wire 128, the opening allows access to the space 112 in the device 110. In some embodiments, attached to each of the one or more spaces on the carousel for the one or more tools is a tool holder 225a, 225b (collectively referenced hereinafter as tool holder 225). Each tool holder 225 is configured to reversibly attach under the force of gravity to the tool. In some embodiments, attached to each of the one or more spaces on the carousel for the one or more objects 290 is an object holder 224a. 224b (collectively referenced hereinafter as object holder 224). Each object holder 224 is configured to reversibly attach under the force of gravity to the at least one object 290.

In some embodiments the wire is a set of three or more wires. In some of these embodiments, the multiple wires surround the coupler 232 or tool 230 or object 290. The wire is long enough to pass an object 290 suspended from the tool 230 entirely into the device 110 inside the controlled environment chamber 102. A distance from a top of the drum 124 to a bottom of the carousel 222 is less than a vertical distance D 113 of the space 112 inside the device 110, so the transfer mechanism 200 is said to have a low profile.

2. Example Embodiments

According to an example embodiment, a low-profile transfer mechanism has been implemented in an ultra-high vacuum environment for transferring a scanning tunneling microscope (STM) experiment into and out of the bore of a superconducting magnet cooled by a cryostat. In an embodiment, the dimensions of the bore are about fifty (50) millimeters in diameter and 1.5 meters in length.

Figure 3:
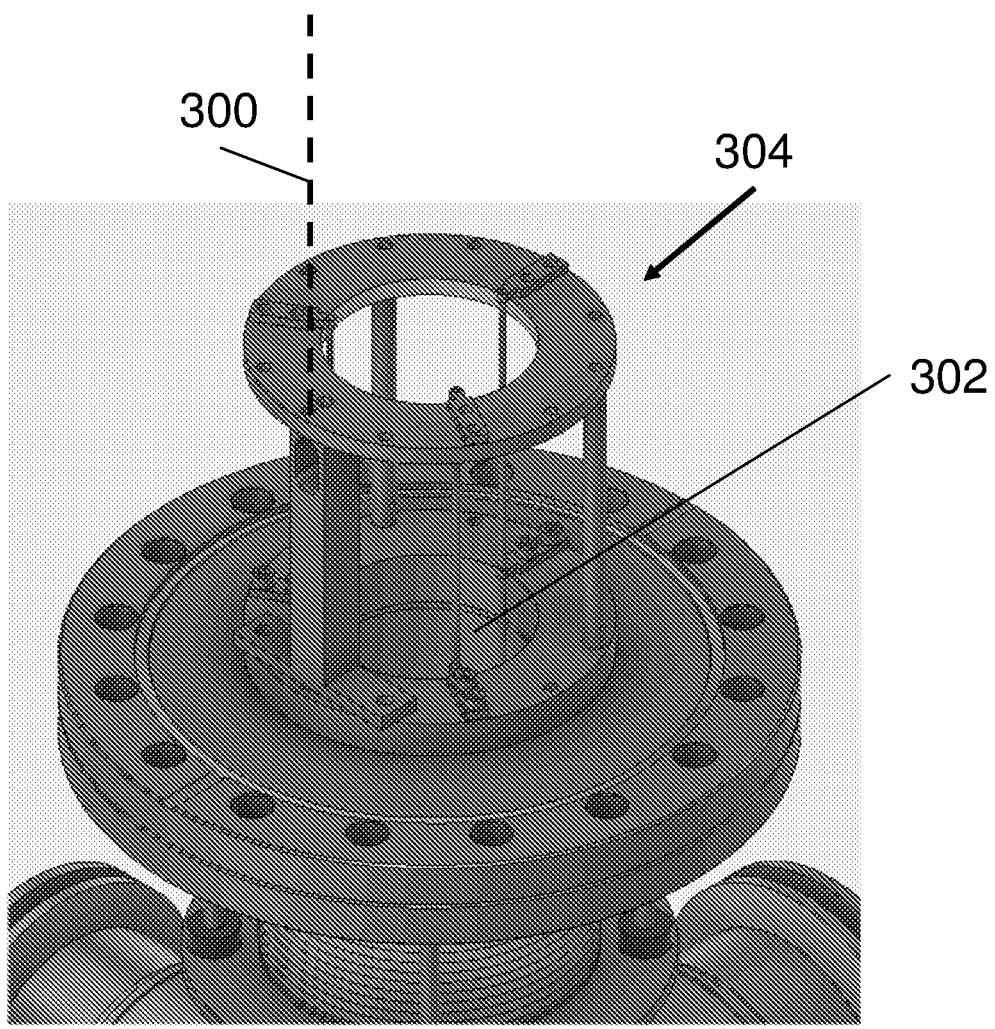
FIG. 3 is a perspective diagram that illustrates an example base for attaching a transfer mechanism, according to an embodiment.

FIG. 3 is a perspective diagram showing an example base 304 for attaching a transfer mechanism disposed atop a bore 302 that leads to a portion of the controlled environment inside the device 110. A dashed line represents an axis of rotation 300 of the axle 223 of FIG. 2. The bore 302 is positioned under the pass-through opening 226 in the carousel 222. In this configuration, at one angle of rotation of the carousel (not shown), the opening in the carousel will be aligned with the bore 302.

Figure 4:
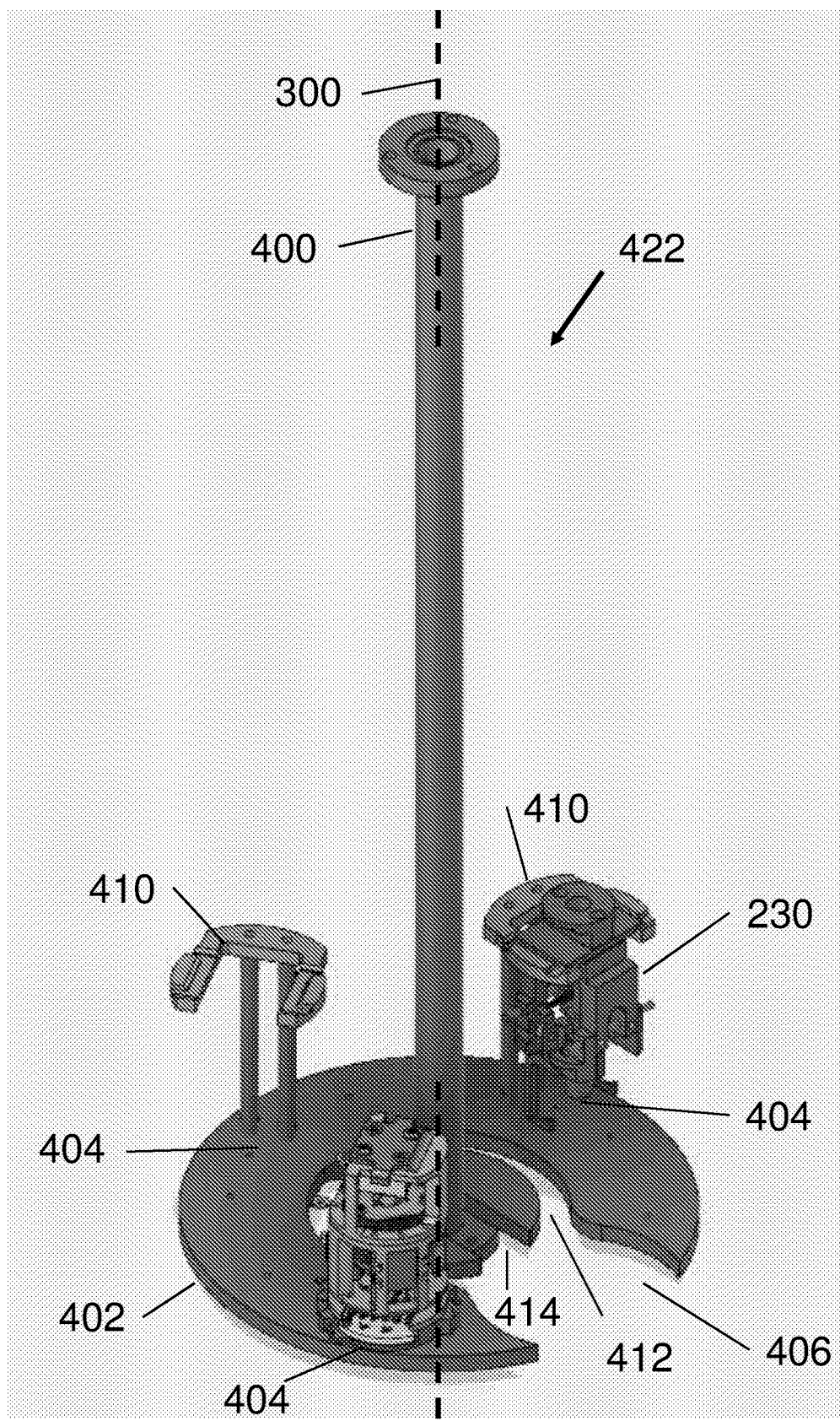
FIG. 4 is a perspective diagram that illustrates an example carousel for rotating around a vertical axis, according to an embodiment.

FIG. 4 is a perspective diagram that illustrates an example embodiment of the carousel 422 that includes an axle 400 that rotates about the axis of rotation 300 and which is secured to a carousel deck 402. The carousel deck 402 includes plural storage spaces 404 and a pass-through opening 406 through which the coupler 232, the tool 230, and an object 290 may pass vertically when suspended from the wire arrangement 128 which may include one or more wires. The storage spaces 404 occupy corresponding positions centered at a first set of horizontal angles; and, the pass-through opening 406 occupies a position centered at a different second horizontal angle. A storage space 404 may remain unused, may store a tool 230, or may store an object 290. A stored tool 230 or object 290 may be disposed in a holder 410 that is secured to the carousel deck 402. The carousel deck 402 may further include one or more slots 412 that accommodate a guide rail (shown in FIG. 19) that guides the coupler 232 as the coupler 232 is raised and lowered. Otherwise, carousel deck 402, which rotates about the axis of rotation 300 would run into the guide rail, which is stationary. The carousel deck 402 may further include a translational slot 414 that permits the entire carousel 422 to translate. A flange 416 at the top of the axle 400 is attached to a drive (not shown) configured to rotate the carousel 422

Figure 5:
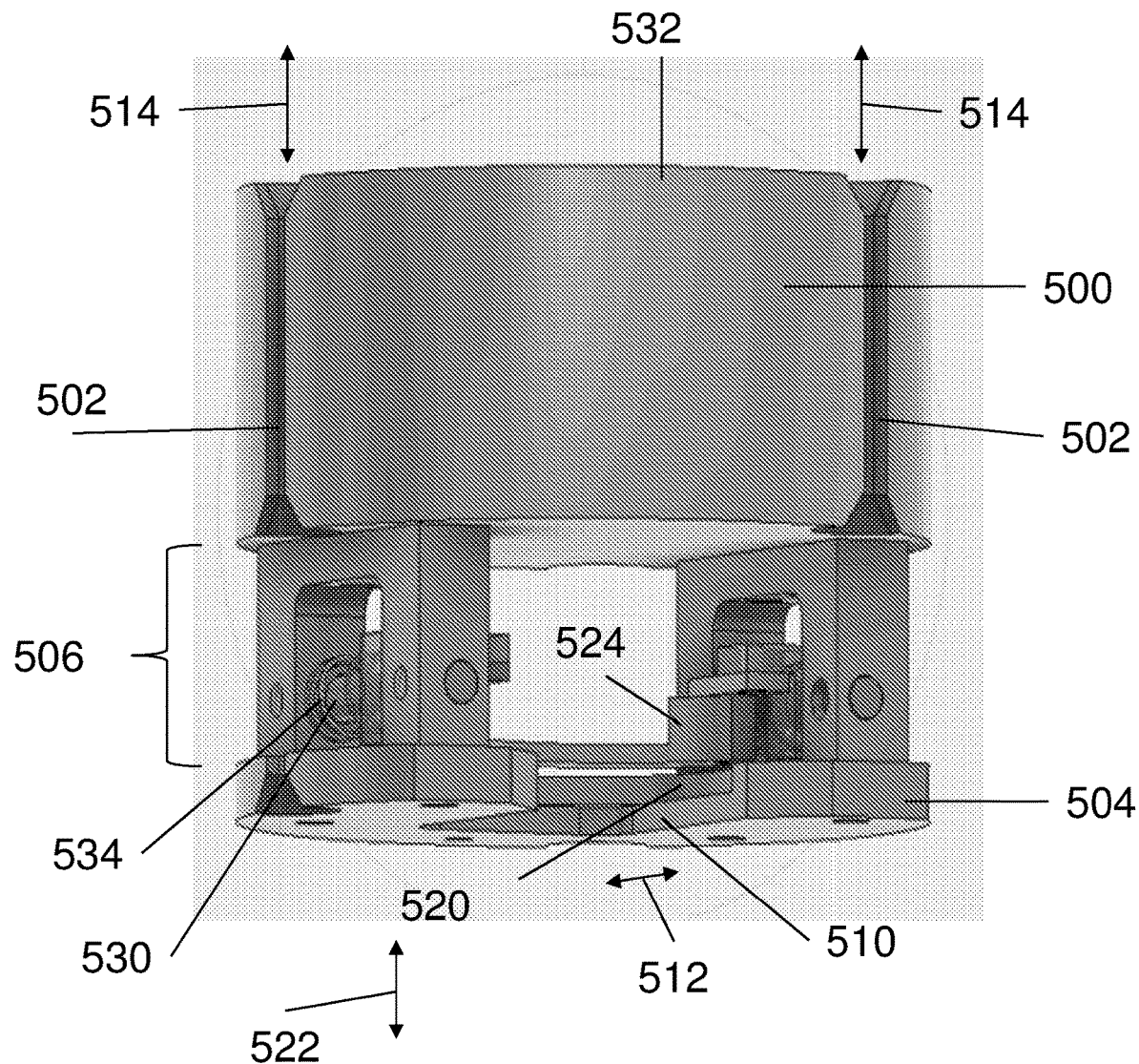
FIG. 5 is a perspective diagram that illustrates an example coupler to reversibly attach to a tool under the force of gravity, according to an embodiment.

FIG. 5 is a perspective diagram that illustrates an example embodiment of a coupler 532 including a body 500 with a groove 502. The body 500 is a mass suitable to stabilize the raising and lowering action as well as to reset the tools as disclosed below. In an embodiment, the weight of the body 500 is about 900 grams. The weight can be adjusted to suit applications, for example, to match the spring strength of the gravity tool 230 for drop-off and pick-up operation and tool resetting, as discussed below. Each groove 502 receives and retains a respective guide rail (not shown). The guide rail maintains alignment of the coupler 532 as the coupler 532 is raised and lowered. The coupler 532 further includes a foot 504 secured to the body 500 and set apart from the body 500 to form a gap 506 between the foot 504 and the body 500. The foot 504 includes a receiving slot 510 that extends along axis 512 transverse to axis 514 along which the grooves 502 extend. Disposed in the receiving slot 510 is a cradle 520 that extends along axis 522 transverse to the axis 512 of the slot 510. The cradle 520 is shaped to cooperate with a shape of a handle (shown in FIG. 7) that fits into the cradle 520. The handle is first moved laterally radially inward along axis 512 into the gap 506 and then lowered along axis 522 into the cradle 520. The receiving slot 510 exists at least to prevent interference between the foot 504 and any part of the handle that hangs below the foot 504 during the lateral movement. The cooperation between the shape of the cradle 520 and the shape of the handle prevents lateral movement of the handle when the handle is seated in the cradle 520. The coupler 532 also includes a door 524 that moves back and forth along axis 512. When positioned relatively radially inward, the door 524 is positioned over the handle. This traps the handle in the cradle 520, thereby preventing the handle from lifting out of the cradle 520. This configuration effectively locks the handle into the cradle 520. When positioned relatively radially outward, the door 524 does not prevent the handle from lifting out of the cradle 520, thereby permitting removal of the handle from the coupler 532. In the example shown, the door 524 rides along guide rails 530 and is biased into a relatively radially inward position by at least one spring 534.

Figure 6:
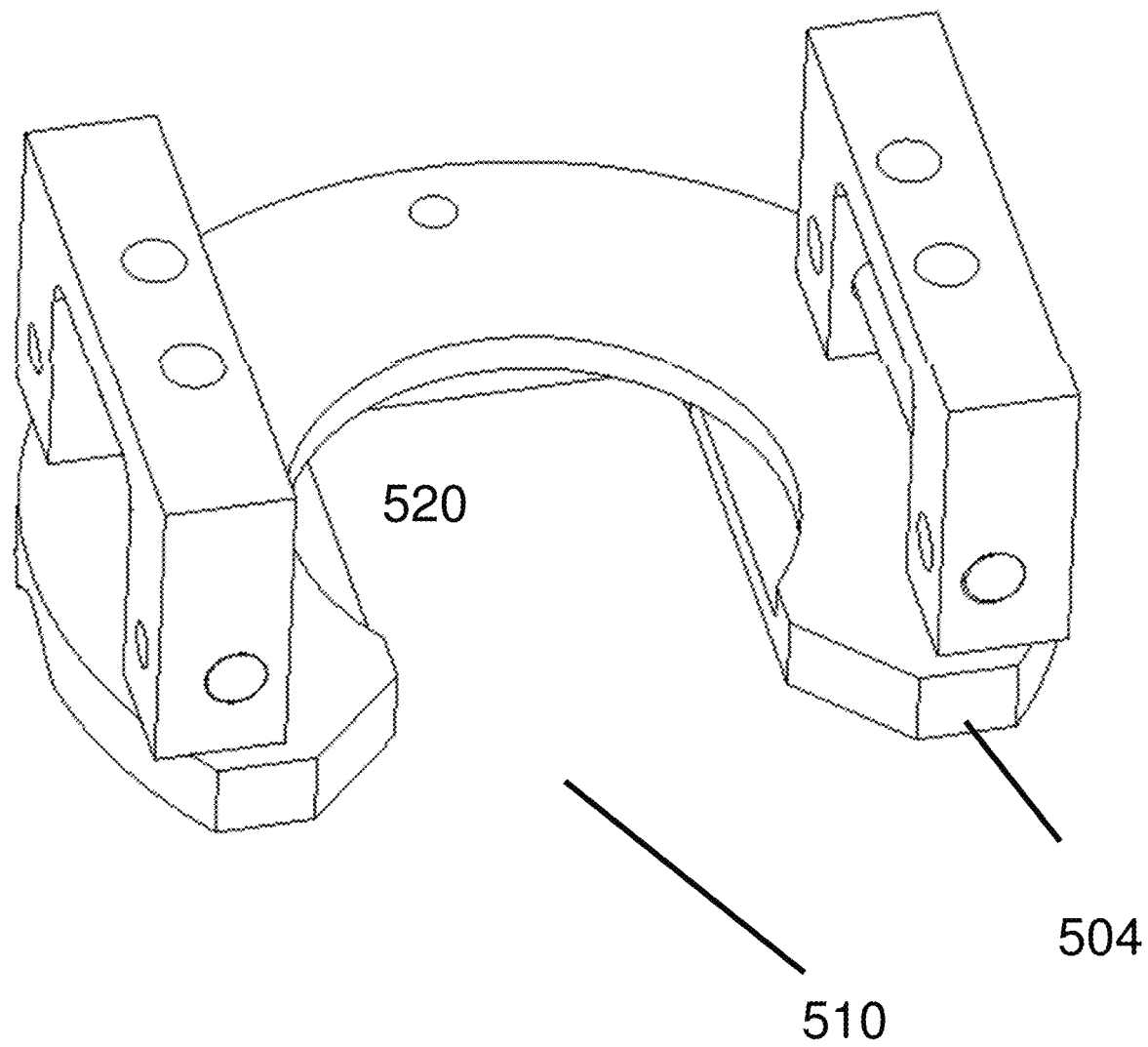
FIG. 6 is another perspective diagram that illustrates the example coupler of FIG. 5.

FIG. 6 is a perspective diagram that illustrates the coupler 532 from above and without the body 500 for clarity. The cradle 520 in the receiving slot 510 includes a recessed circular shape that locks a correspondingly circular handle therein.

Figure 7:
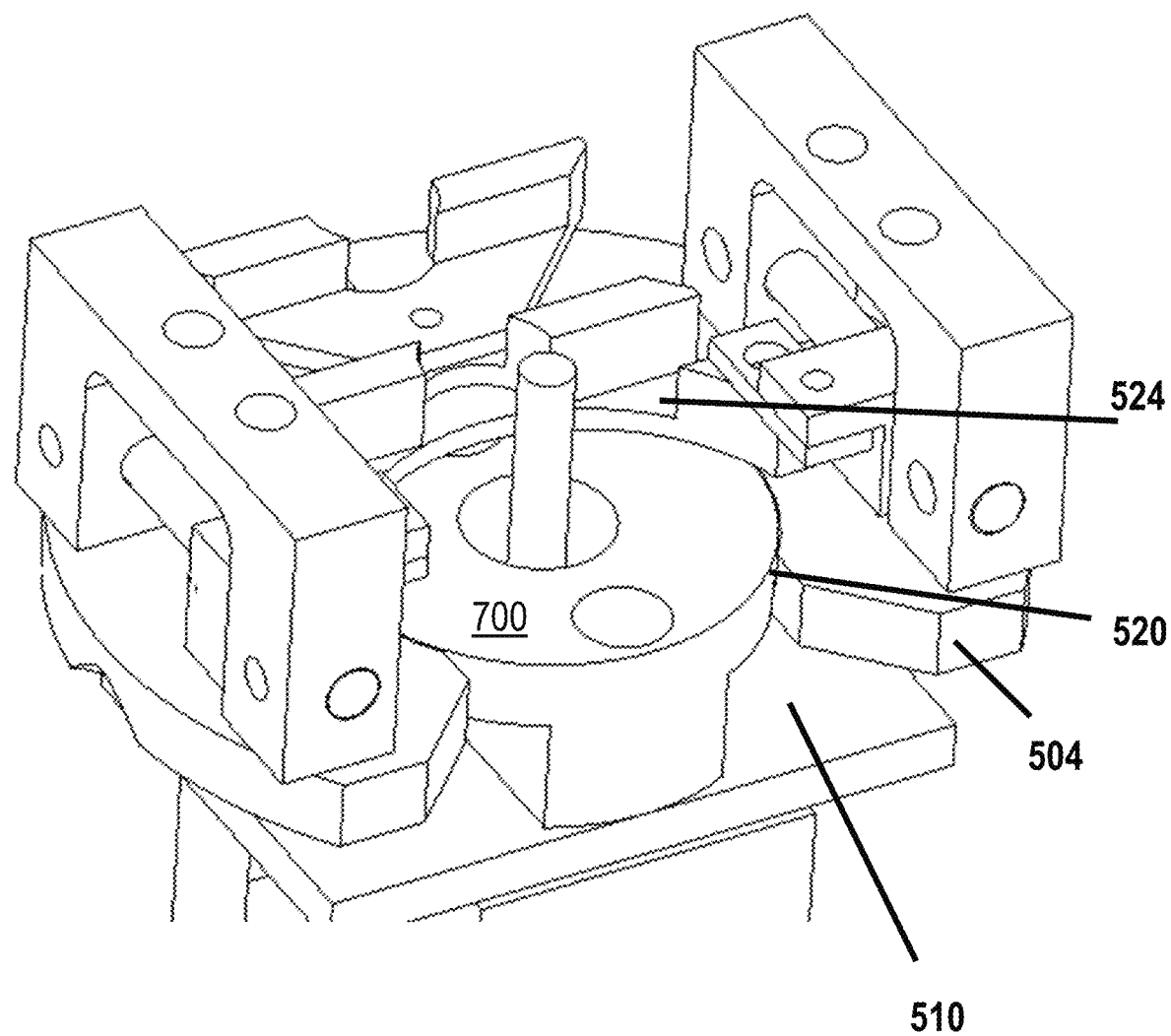
FIG. 7 and FIG. 8 are other perspective diagrams that illustrate a handle of the coupler of FIG. 5.
Figure 8:
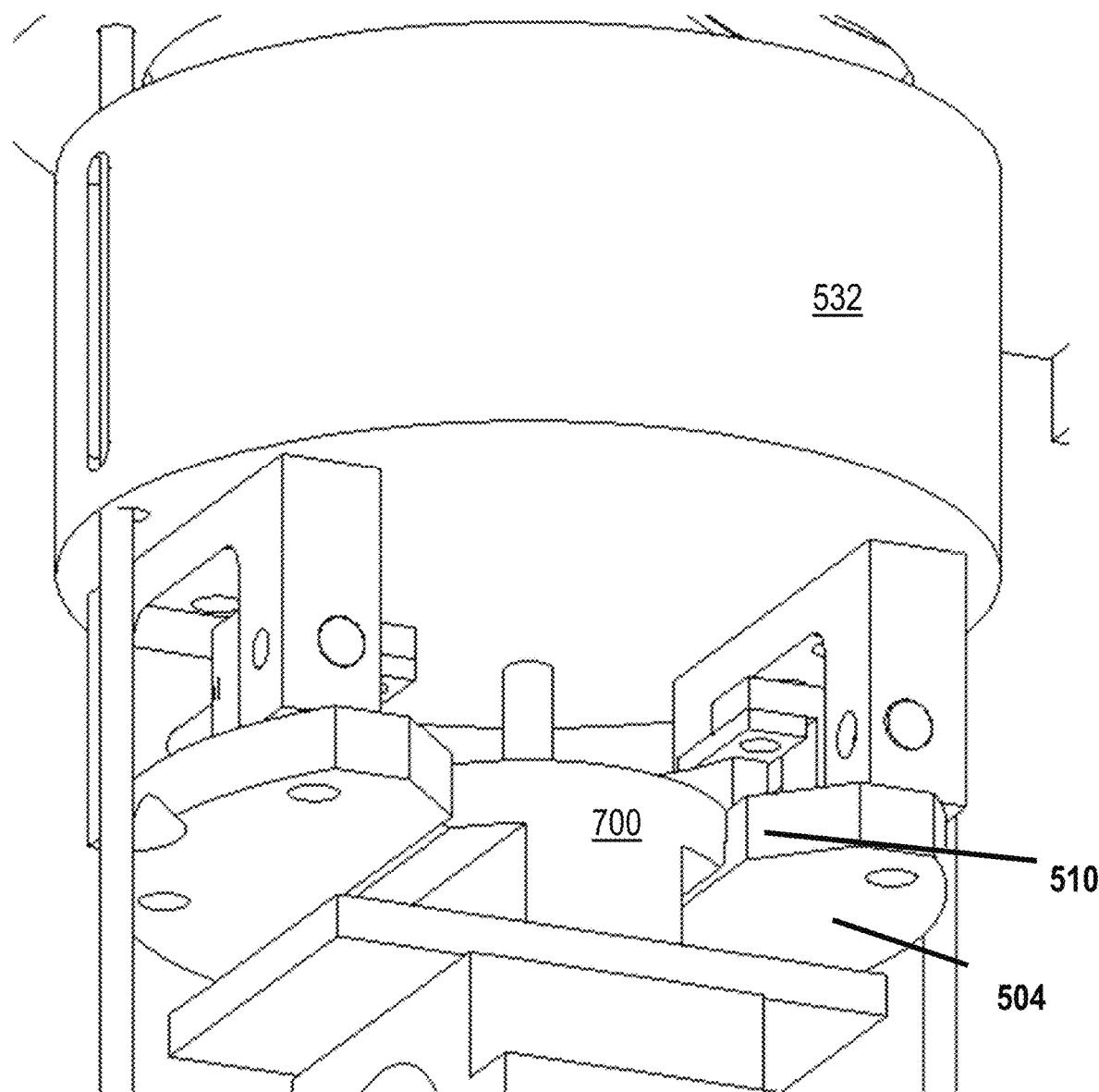

FIGS. 7 and 8 are perspective diagrams that illustrate a handle 700 seated and trapped in the cradle 520 by the door 524 which is positioned relatively radially inward. FIG. 8 also shows that the receiving slot 510 prevents interference between the handle 700 and the foot 504.

Figure 9:
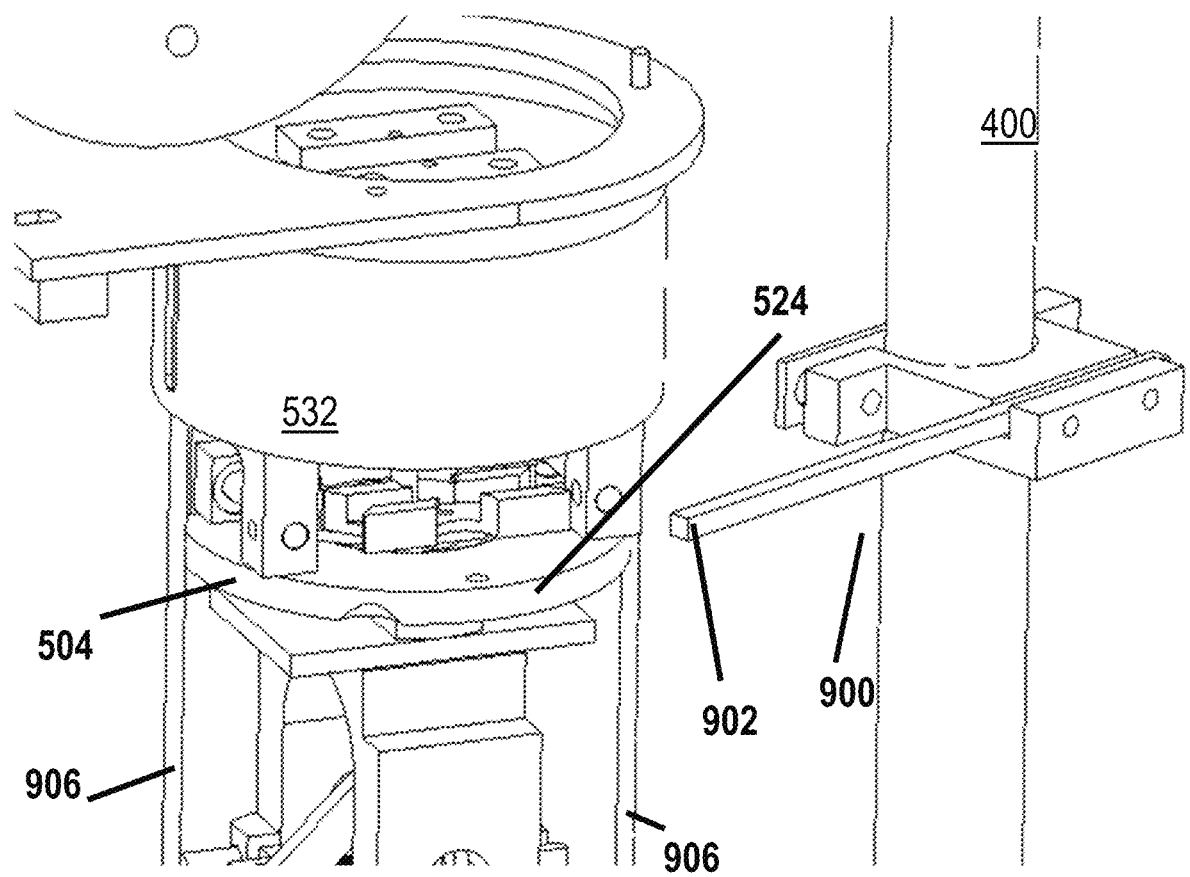
FIG. 9 is another perspective diagram that illustrates the example coupler of FIG. 5.

FIG. 9 is a perspective diagram that illustrates the coupler 532 from behind and positioned in the transfer mechanism 200 next to the axle 400 of the carousel 422. In this operational configuration, the coupler 532 is held in place via guide rails 906 attached to a support structure for the winch. When the axle 400 is rotated, a key 900 secured to the axle 400 also rotates. An end 902 of the key 900 can be used to push the door 524 relatively radially inward into a closed position. To push the door 524 to a relatively radially outward position, e.g. an open position, the carousel is translated away from the coupler 532 slightly and/or raised upward until the key 900 clears the coupler 532. Then the axle 400 is rotated to put the end 902 of the key in front of the coupler where it can push the door 524 into the open position.

Figure 10:
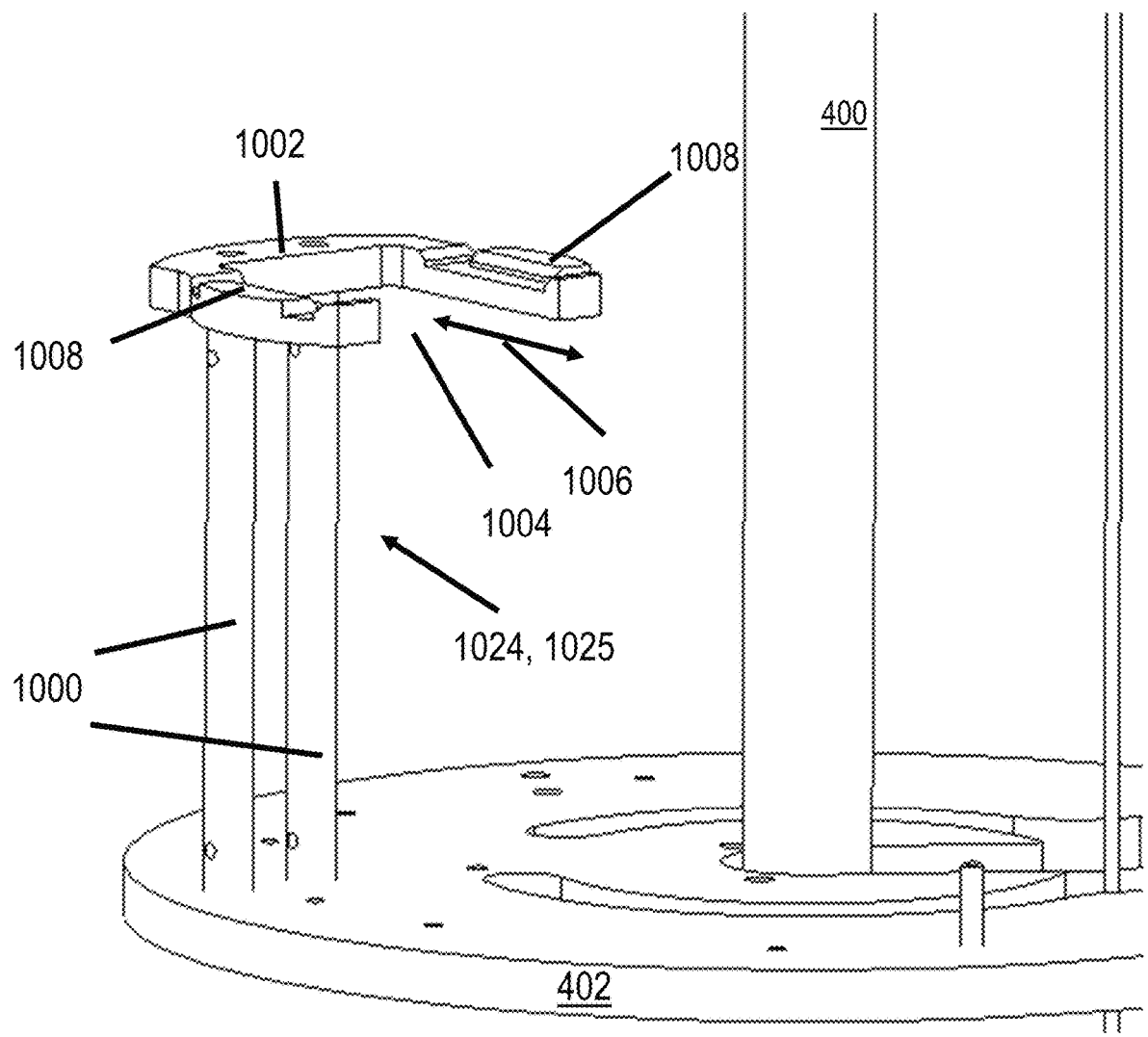
FIG. 10 is a perspective diagram that illustrates an example holder to reversibly attach to an object or tool under the force of gravity and configured to be attached to the carousel, according to an embodiment.

FIG. 10 is a perspective diagram that illustrates a holder 1024, 1025 that includes vertical supports 1000 secured to the carousel deck 402 and a stand plate 1002 supported by the vertical supports 1000. Holder 1024 holds an object, whereas holder 1025 holds a tool. The holder 1024, 1025 includes a receiving slot 1004 that extends along an axis 1006 disposed transverse to the vertical supports 1000. Horizontal supports 1008 on either side of the receiving slot 1004 are configured to receive and suspend a tool 230 or an object 290 therefrom once the tool 230 or object 290 is lowered onto the horizontal supports 1008. Optionally, the tool 230 or object 290 is moved laterally as well, which is made possible by the receiving slot 1004.

Figure 11:
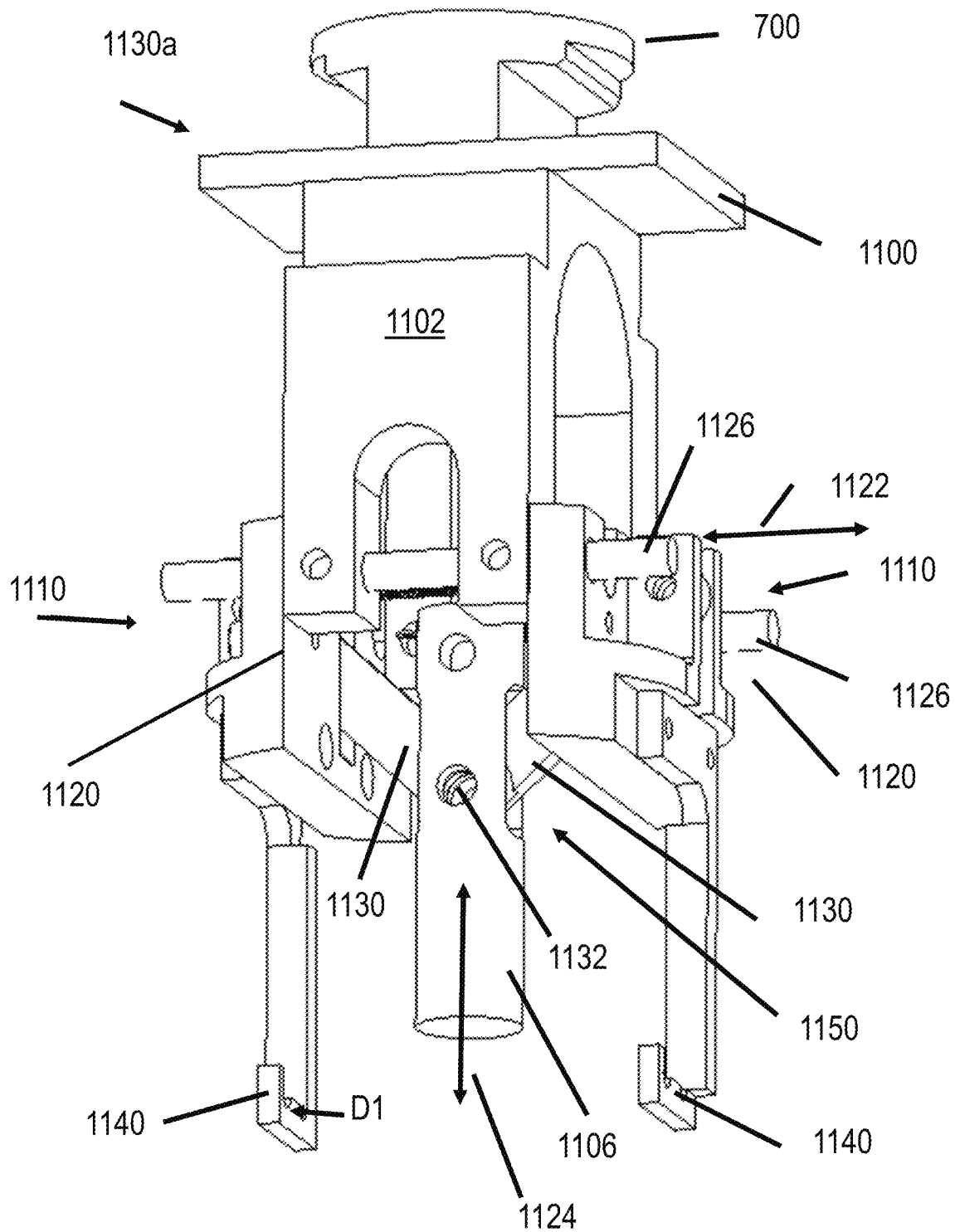
FIG. 11 is a perspective diagram that illustrates an example drop-off tool, according to an embodiment.

FIG. 11 is a perspective diagram that illustrates an example of a drop-off tool 1130a with a handle 700 comprising a shape configured to cooperate with the cradle 520 of the coupler 532, a holder plate 1100 having a shape configured to interact with a shape of the horizontal supports 1008 of the holder 1024, 1025, a housing 1102, a central passage (not visible) through the housing 1102 and the handle 700, and a floating element 1106. The floating element 1106 moves through a range of positions bounded by an upper position (not shown), a lower position shown, and a neutral position between the upper position and the lower position.

The drop-off tool 1130a includes at least one flip-flop linkage 1110. The embodiment shown includes twin, opposed flip-flop linkages 1110. A flip-flop linkage 1110 as used herein describes an arrangement that can flip-flop between two positions. A spring (not visible) biases the flip-flop linkage 1110 into one or the other of the two positions, and which position the spring urges the flip-flop linkage 1110 into depends on which side of a neutral position the floating element 1106 is positioned on at the moment.

Each flip-flop linkage 1110 includes a sliding block 1120 constrained to move along an axis 1122 that is perpendicular to an axis 1124 along which the floating element 1106 moves. In this example, the movement of the sliding block 1120 is so limited by one or more guiding rods 1126. A coupler link 1130 is pivotally connected to a respective sliding block 1120 and to the floating element 1106. In the embodiment shown, both coupler links 1130 connect to the floating element 1106 at a common joint 1132. The drop-off tool is shown in a default position in which a hook 1140, which is secured to the sliding block 1120 and which holds the tool 230 or the object 290, is a first distance D1 from the housing 1102 perpendicular to the axis 1124. In an example embodiment, D1 is about twenty-two (22) millimeters, which may be adjusted so that the tool 1130a tightly carries the object.

Figure 12:
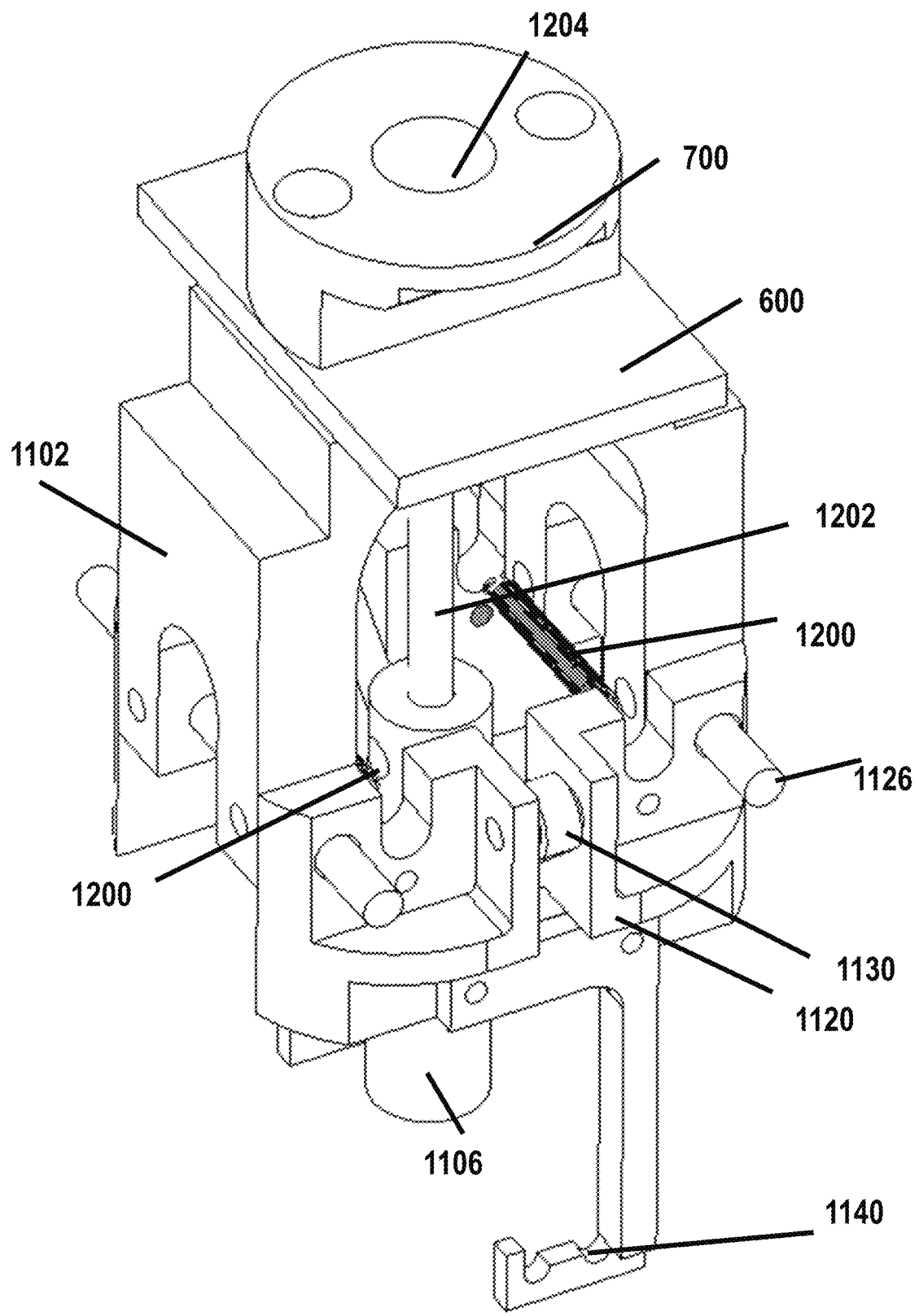
FIG. 12 is another perspective diagram of the drop-off tool of FIG. 11.

FIG. 12 is a perspective diagram that illustrates the drop-off tool 1130a in the same configuration as in FIG. 11 and from a different angle. The springs 1200 are visible, as is an upper portion 1202 of the floating element 1106.

In operation, the carousel 422 and winch are maneuvered by an operator using the transfer mechanism control module 150 of the controller 140 to do the following steps. In one step, the carousel is maneuvered to position the drop-off tool 1130a in the coupler 532. The carousel 422 is further maneuvered in another step to move the hooks 1140 of the drop-off tool 1130a into the object 290 to be lowered into the portion of the controlled environment inside the device 110. The carousel 422 is maneuvered in a third step so the pass-through opening 406 is under the assembly of the coupler 532, the drop-off tool 1130a suspended from the coupler 532, and the object 290 suspended from the drop-off tool 1130a. In a fourth step, the winch rotates the drum 124 to lower the assembly. Once the assembly reaches its destination, the object 290 cannot be lowered any farther. However, the drop-off tool 1130a can be lowered relative to the finally positioned object 290. Continued lowering with the gravitational force provided by the body 500 causes the floating element 1106 to strike the top of the object 290. Under this gravitational force, the floating element 1106 is forced to move vertically relative to the housing 1102. This raises the common joint 1132 against the downward bias of the spring. When the coupler links 1130 reach a horizontal position the flip-flop linkage 1110 is in the neutral position. In the neutral position the coupler links 1130 and the spring are parallel to each other. This eliminates any upward or downward force imparted on the floating element 1106 from the spring. Further upward movement of the floating element 1106 and the pivot joint creates an upward angle between the spring and the coupler links 1130. This results in the spring imparting an upward bias on the floating element 1106 toward the upper position. This upward movement of the floating element 1106 thereby flips the direction of force imparted by the spring. When the floating element 1106 is in the upper position, the hooks 1140 are at a second, greater distance D2 from the housing 1102 perpendicular to the axis 1124. The second distance is sufficient to clear parts of the object 290 that were previously engaged in the hooks 1140. In an example embodiment, distance D2 is approximately thirty (30) millimeters. Distance D2 may be limited by a diameter of the bore 302 and guiding structures of the winch. This allows the drop-off tool to be raised while leaving the object 290 in the second controlled environment of the device 110.

When the floating element 1106 is in the upper position, the upper portion 1202 of the floating element 1106 protrudes from the handle 700 through the central passage 1204. To reset the floating element 1106 to the lower position, which is necessary to pick up another object 290, the carousal is rotated in another step so that drop-off tool 1130a is placed in the holder 1025. In a subsequent step, the coupler 532 with its gravitational mass in body 500 is lowered onto the end of the upper portion 1202 of the floating element 1106 and provides sufficient gravitational force until the floating element 1106 passes the neutral position and flops toward the lower position.

It should be noted that, when the floating element 1106 is in the lower position, the common joint 1132 is farther from the neutral position than when the floating element 1106 is in the upper position. The farther the common joint 1132 is from the neutral position, the closer the hooks 1140 get to the housing 1102 and each other. In the lower position the hooks 1140 need to be relatively close to each other to engage the object 290 to be delivered inside the device. The opposite is true to release the object once delivered, because the hooks 1140 cannot be laterally moved out from under the object 290 once it is delivered. By fixing the upper position closer to the neutral position, the hooks 1140 remain farther from the housing 1102 and each other, enabling the necessary clearance. Fixing the distance of the floating element 1106 in the upper and lower positions can be achieved by any means known, including mechanical stops, etc.

In the example shown, the coupler links 1130 are connected to the common joint 1132 inside a slot 1150 in the floating element 1106. Instead of being located in the middle of the slot 1150, which would cause the common joint 1132 to be the same distance from the neutral position in the upper and lower positions, the common joint 1132 is located toward the bottom end of the slot 1150. This causes mechanical interferences between the slot and the coupler links 1130 to occur at different angular distances from horizontal, depending on which direction the couplers are moving, which, in turn, results in the different distances of the upper and lower positions relative to the neutral position.

Figure 13:
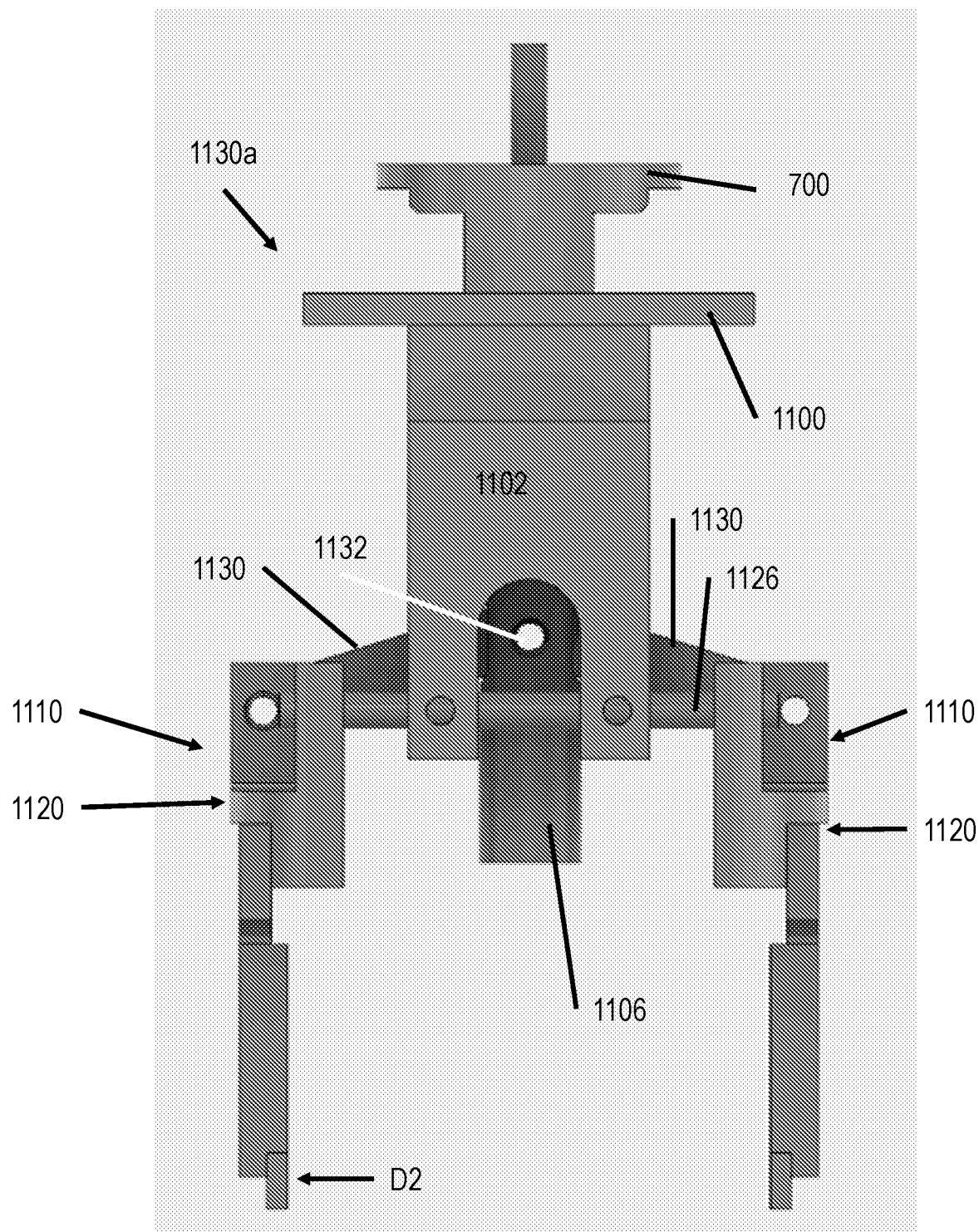
FIG. 13 is a front view diagram of the drop-off tool of FIG. 11.

FIG. 13 is a front view diagram that illustrates the drop-off tool 1130a in the release configuration with the floating element 1106 in the upper position and D2 which is greater than D1.

Figure 14:
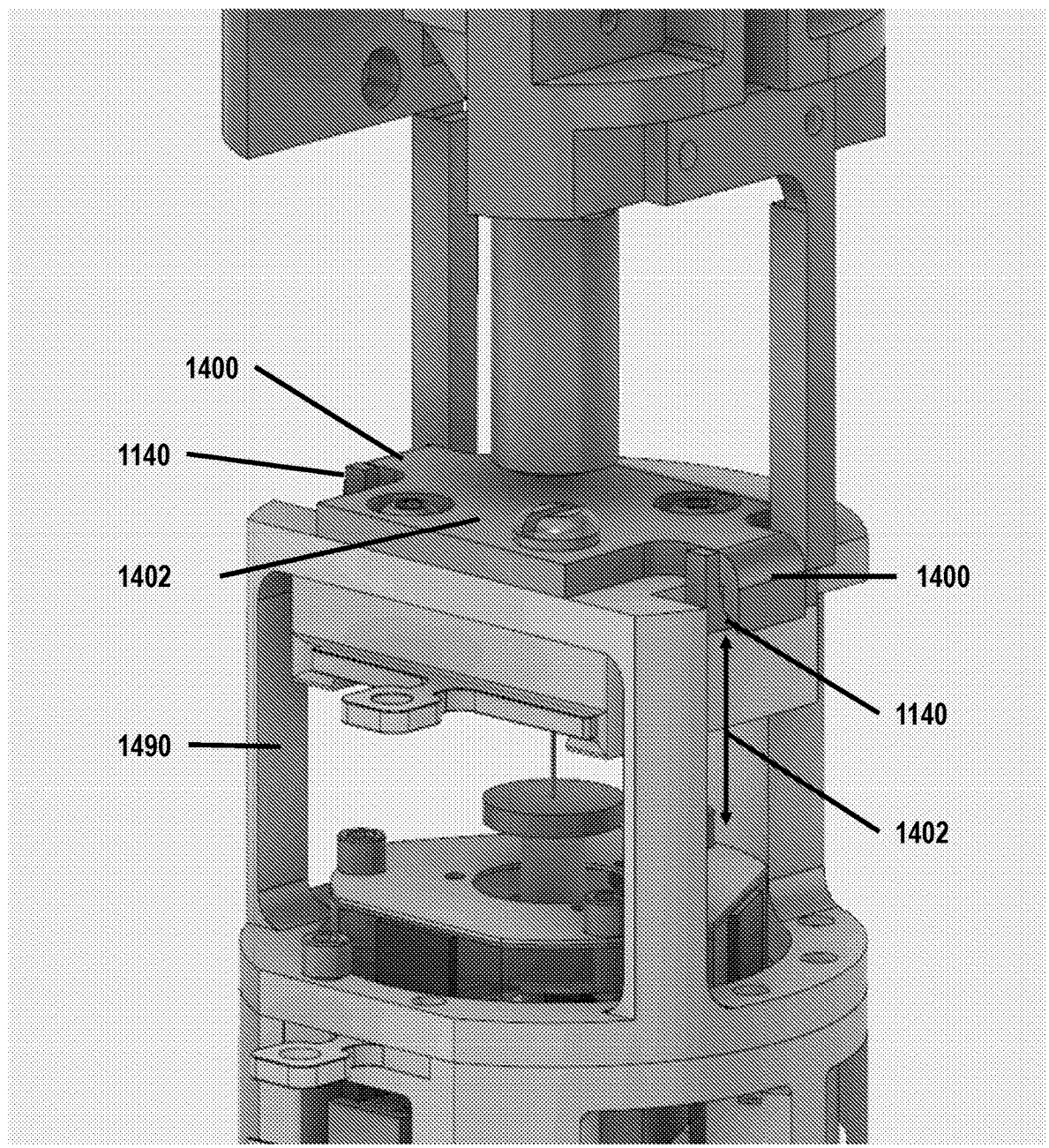
FIG. 14 is a perspective diagram showing operation of hooks of the drop-off tool of FIG. 11.

FIG. 14 is a perspective diagram that illustrates how an embodiment of the hooks 1140 engage tabs 1400 of a top plate 1402 of the object 1490 when the drop-off tool 1130a is in the default position where the floating element (not visible) is in the lower position. Clearance 1404 below the hooks 1140 allows the drop-off tool 232a to be lowered relative to the object 1490 once the object reaches its resting location. Continued lowering of the drop-off tool 1130a causes the floating element 1106 to contact the top plate 1402 which pushes the floating element 1106 upward until the floating element 1106 flip-flops to the upper position. In the upper position the hooks 1140 are far enough apart to clear the tabs 1400 so the drop-off tool 1130a can be lifted back to the first controlled environment.

Figure 15:
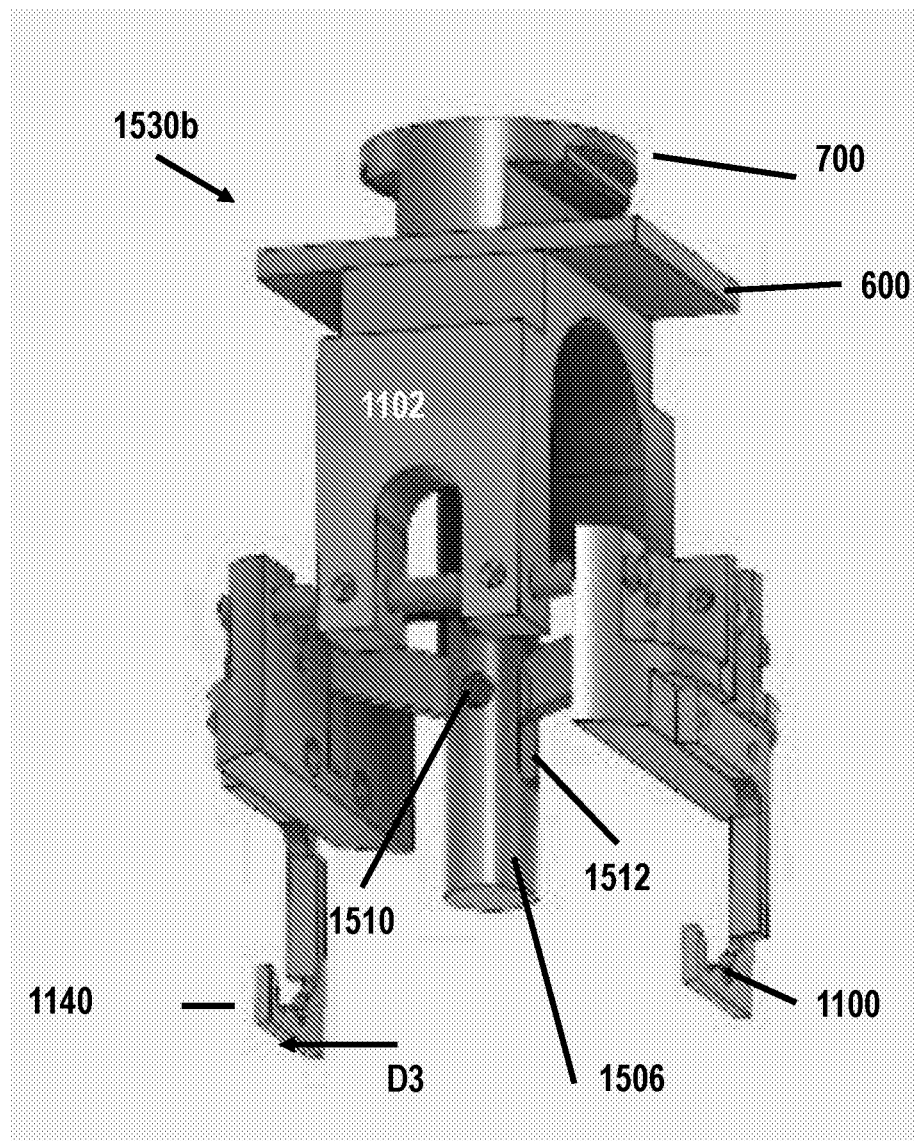
FIG. 15 is a perspective diagram that illustrates an example pickup tool, according to an embodiment.
Figure 16:
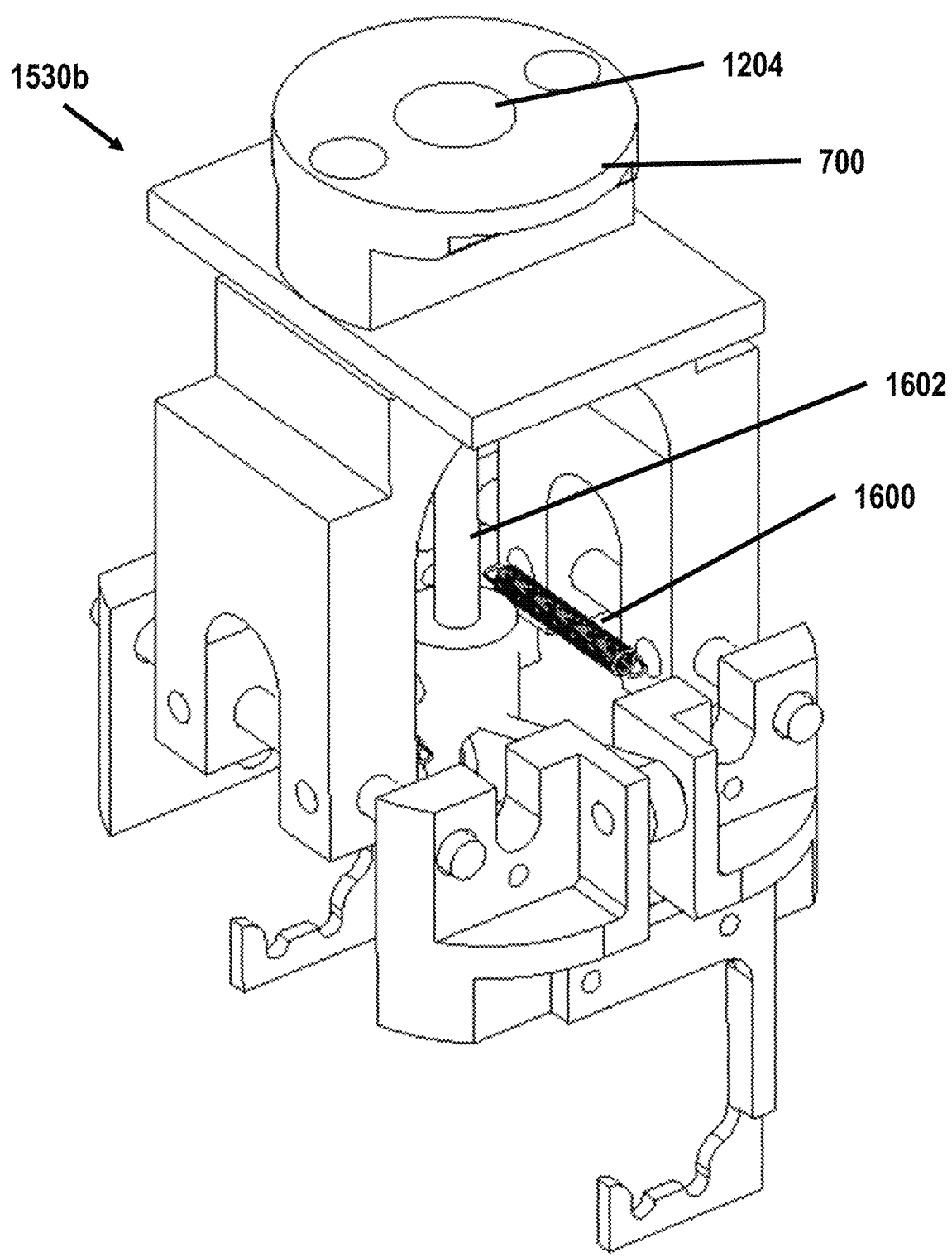
FIG. 16 is another perspective diagram of the pickup tool of FIG. 15.

FIG. 15 and FIG. 16 are perspective diagrams that illustrate an example of a pickup tool 1530b in the default position. In this example, most of the components of the pickup tool 1530b are the same as those in the drop-off tool 1130a. However, this is not meant to be limiting and other embodiments having other differing components are possible. The pickup tool 1530b includes the handle 700 comprising the shape configured to cooperate with the cradle 520 of the coupler 532, the holder plate 1100 having the shape configured to interact with the shape of the horizontal supports 1008 of the holder 1024, 1025, the housing 1102, the central passage 1204 through the housing 1102 and the handle 700, and the floating element 1506. The floating element 1506 moves through a range of positions bounded by an upper position (not shown), a lower position shown, and a neutral position between the upper position and the lower position. Springs 1600 bias the sliding block 1120 toward the housing 1102. The floating element 1506 includes the upper portion 1602 that protrudes through the handle 700 when the flip-flop linkage flips from the position shown.

The pickup tool 1530b operates using the same principles as the drop-off tool 1130a, but oppositely. In the default position the hooks 1140 are at a greater perpendicular distance D3 from the housing 1102, so they are farther apart from each other. This allows the hooks 1140 to clear the tabs 1400 of the top plate 1402 so the pickup tool 1530b can be lowered onto the object 290 when the object 290 is inside the device 110. In an embodiment, the distance D3, which should be larger than distance D1 but smaller than the diameter of the bore 302, is about thirty-one (31) millimeters. Continued lowering of the pickup tool 1530b causes the floating element 1506 to hit the top plate 1402. Further lowering under the force of gravity provided by the body 500 moves the floating element 1506 against the bias of the springs. Once the floating element 1506 passes the neutral position, the springs cease resisting the movement and instead bias the floating element 1506 upward to the upper position.

Figure 17:
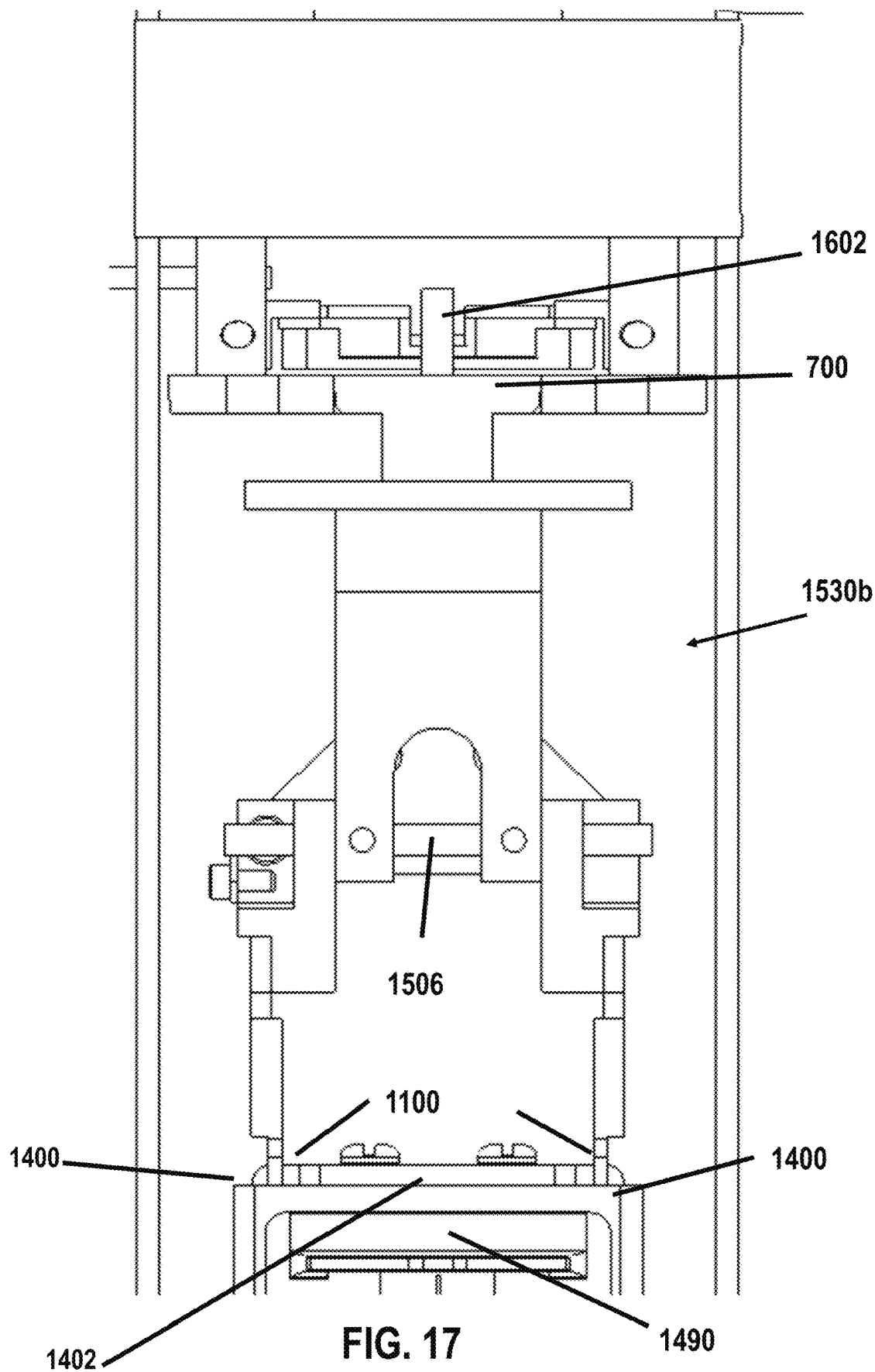
FIG. 17 is a front view diagram of the pickup tool of FIG. 15.

FIG. 17 is a front view that illustrates the floating element 1506 in the upper position and the hooks 1140 engaged in the tabs 1400 of the top plate 1402 of the object 1490. In this position, the pickup tool 1530b can lift/retrieve the object 1490 from inside the device. The upper position is farther from the neutral position than the lower position is. This permits the hooks 1140 to move closer to the housing 1102 when the floating element 1506 is in the upper position than when the floating element 1506 is in the lower position. This is possible due to the different location of the common joint 1510 toward the top of the slot 1512 in the floating element 1506; whereas, in the drop-off tool 1130a, the common joint 1132 is toward the bottom of the slot 1150. Because the common joint 1510 is relatively high in the slot 1512, the coupler links 1130 can rotate farther downward than upward. This allows the hooks 1140 to be closer when the floating element 1506 is in the upper position.

Once the object 1490 is returned to the first controlled environment, the pickup tool 1530b is placed in a holder 1025b and the coupler 532 is lowered onto the upper portion 1602 that protrudes through the handle 700 to flip/reset the pickup tool 1530b.

Figure 18:
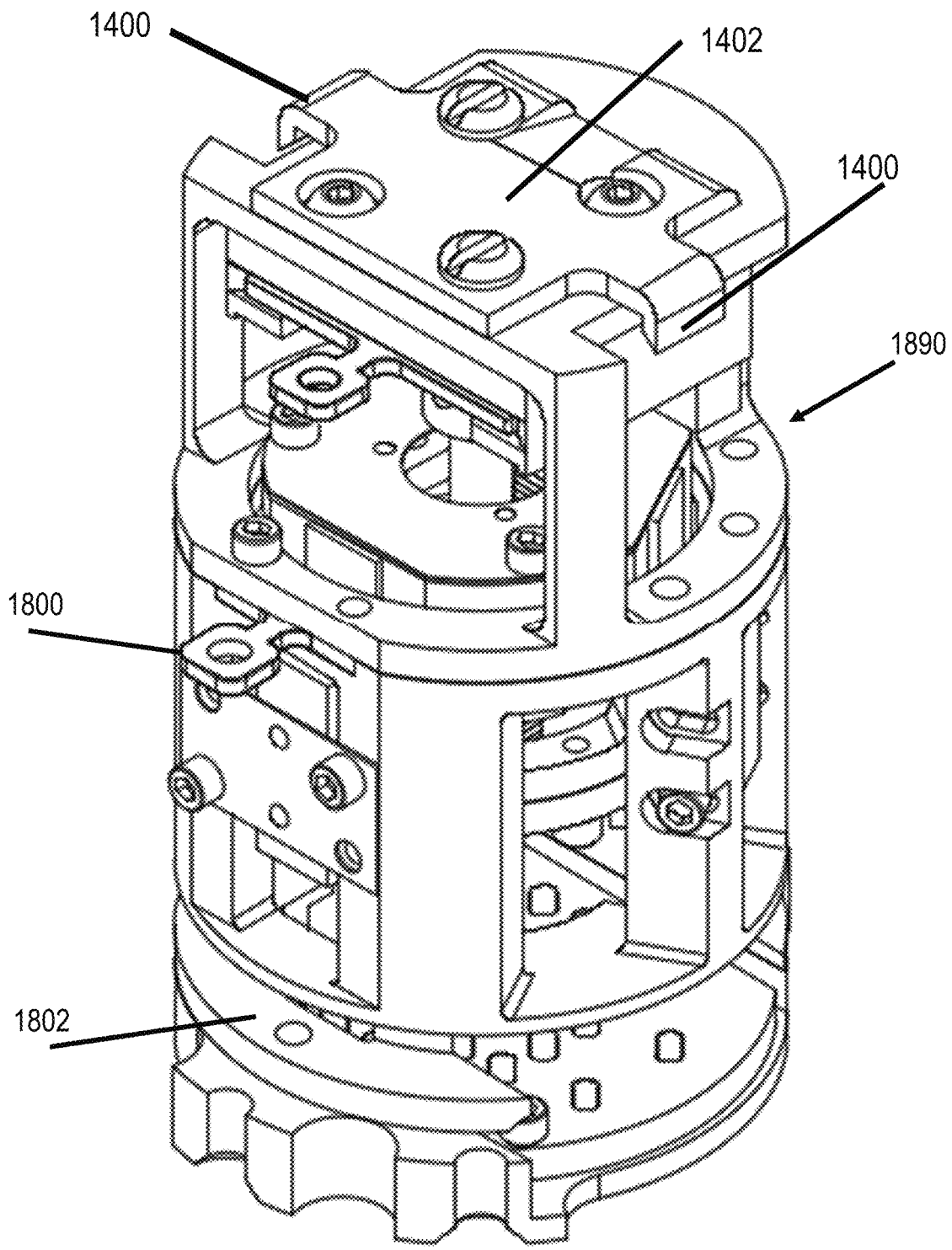
FIG. 18 is a perspective diagram of an example object, according to an embodiment.

FIG. 18 is a perspective diagram that illustrates an example object 1890 that may be dropped off and picked up by the tools. In this example, the object 1890 is a scanning tunneling microscope (STM) with a first sample to be inserted into the superconducting magnet cooled by the cryostat. Other objects include other STM with different samples for comparison. Each STM has several features that can be used to hold and move the object, including the top plate 1402, a mid-level flag hand 1800 and low groove 1802 for receiving a horizontal transfer arm with fork.

Figure 19:
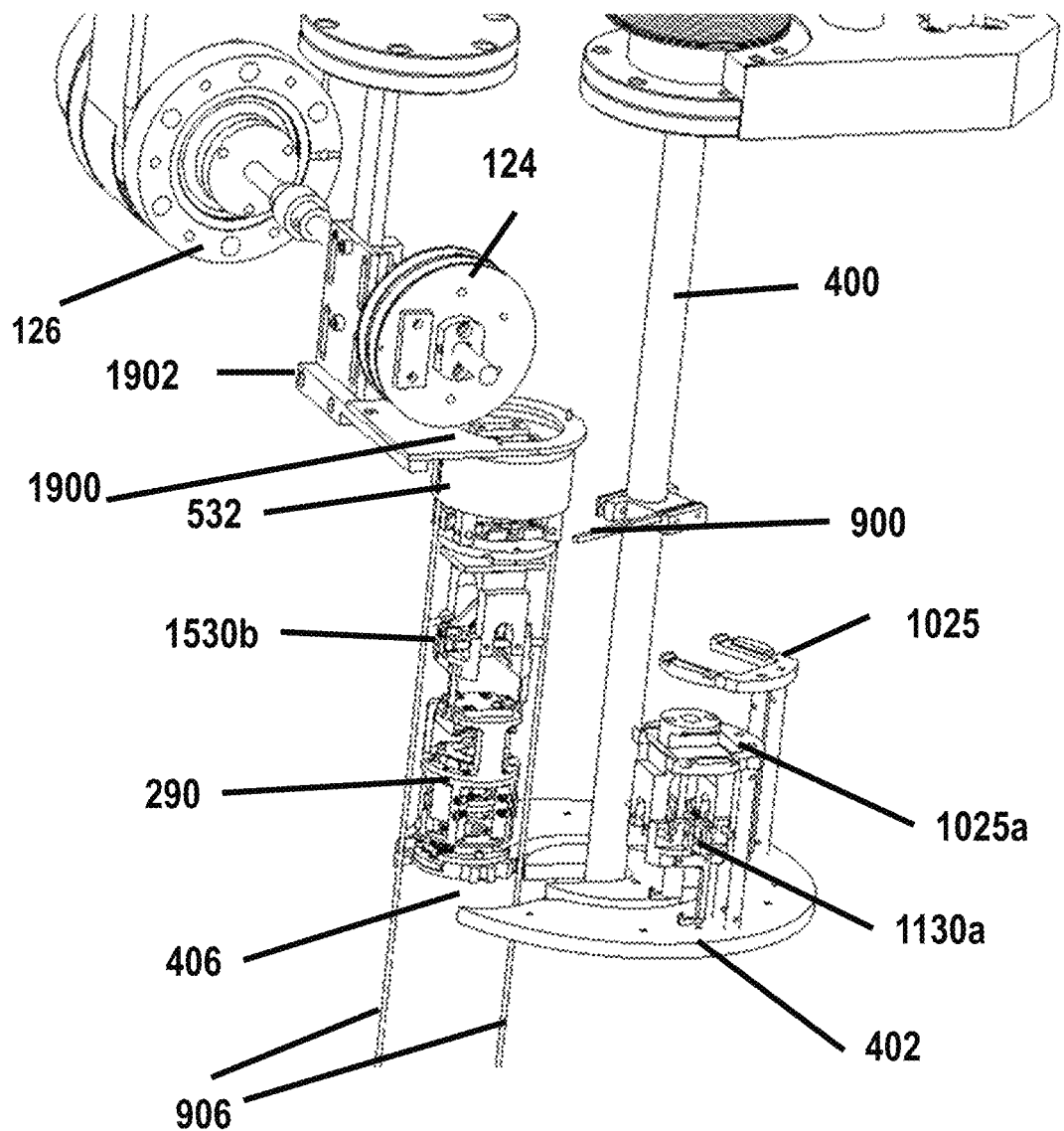
FIG. 19 is a perspective diagram that illustrates an example transfer mechanism, according to an embodiment.

FIG. 19 is a perspective diagram showing components of the transfer mechanism 200, including the drum 124 attached to the motor/transmission, the coupler 532 suspended from the wire (not shown), the pickup tool 1530b suspended from the coupler 532 and carrying the object 290 after having retrieved the object 290 from the second controlled environment through the pass-through opening 406 in the carousel plate 402. Holders 1025, 1025a are disposed on the carousel plate 402, and drop-off tool 1130a is held in/suspended from holder 1025a. A stop 1900 is fixed to a support structure base 1902 and prevents the coupler 532 from rising too far and possibly getting out of alignment.

3. Control Hardware Overview

FIG. 20 is a block diagram that illustrates a computer system 2000 upon which an embodiment of the module 150 may be implemented. Computer system 2000 includes a communication mechanism such as a bus 2010 for passing information between other internal and external components of the computer system 2000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2000, or a portion thereof, constitutes a means for performing one or more steps of one or more methods described herein.

A sequence of binary digits constitutes digital data that is used to represent a number or code for a character. A bus 2010 includes many parallel conductors of information so that information is transferred quickly among devices coupled to the bus 2010. One or more processors 2002 for processing information are coupled with the bus 2010. A processor 2002 performs a set of operations on information. The set of operations include bringing information in from the bus 2010 and placing information on the bus 2010. The set of operations also typically include comparing two or more units of information, shifting positions of units of information, and combining two or more units of information, such as by addition or multiplication. A sequence of operations to be executed by the processor 2002 constitutes computer instructions.

Computer system 2000 also includes a memory 2004 coupled to bus 2010. The memory 2004, such as a random-access memory (RAM) or other dynamic storage device, stores information including computer instructions. Dynamic memory allows information stored therein to be changed by the computer system 2000. RAM allows a unit of information stored at a location called a memory address to be stored and retrieved independently of information at neighboring addresses. The memory 2004 is also used by the processor 2002 to store temporary values during execution of computer instructions. The computer system 2000 also includes a read only memory (ROM) 2006 or other static storage device coupled to the bus 2010 for storing static information, including instructions, that is not changed by the computer system 2000. Also coupled to bus 2010 is a non-volatile (persistent) storage device 2008, such as a magnetic disk or optical disk, for storing information, including instructions, that persists even when the computer system 2000 is turned off or otherwise loses power.

Information, including instructions, is provided to the bus 2010 for use by the processor from an external input device 2012, such as a keyboard containing alphanumeric keys operated by a human user, or a sensor. A sensor detects conditions in its vicinity and transforms those detections into signals compatible with the signals used to represent information in computer system 2000. Other external devices coupled to bus 2010, used primarily for interacting with humans, include a display device 2014, such as a cathode ray tube (CRT) or a liquid crystal display (LCD), for presenting images, and a pointing device 2016, such as a mouse or a trackball or cursor direction keys, for controlling a position of a small cursor image presented on the display 2014 and issuing commands associated with graphical elements presented on the display 2014.

In the illustrated embodiment, special purpose hardware, such as an application specific integrated circuit (IC) 2020, is coupled to bus 2010. The special purpose hardware is configured to perform operations not performed by processor 2002 quickly enough for special purposes. Examples of application specific ICs include graphics accelerator cards for generating images for display 2014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2000 also includes one or more instances of a communications interface 2070 coupled to bus 2010. Communication interface 2070 provides a two-way communication coupling to a variety of external devices that operate with their own processors, such as printers, scanners and external disks. In general, the coupling is with a network link 2078 that is connected to a local network 2080 to which a variety of external devices with their own processors are connected. For example, communication interface 2070 may be a parallel port or a serial port or a universal serial bus (USB) port on a personal computer. In some embodiments, communications interface 2070 is an integrated services digital network (ISDN) card or a digital subscriber line (DSL) card or a telephone modem that provides an information communication connection to a corresponding type of telephone line. In some embodiments, a communication interface 2070 is a cable modem that converts signals on bus 2010 into signals for a communication connection over a coaxial cable or into optical signals for a communication connection over a fiber optic cable. As another example, communications interface 2070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 2070 sends and receives electrical, acoustic or electromagnetic signals, including infrared and optical signals, that carry information streams, such as digital data.

The term computer-readable medium is used herein to refer to any medium that participates in providing information to processor 2002, including instructions for execution. Such a medium may take many forms, including, but not limited to, non-volatile media, volatile media and transmission media. Non-volatile media include, for example, optical or magnetic disks, such as storage device 2008. Volatile media include, for example, dynamic memory 2004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 2002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 2002, except for carrier waves and other signals.

Logic encoded in one or more tangible media includes one or both of processor instructions on a computer-readable storage media and special purpose hardware, such as ASIC 2020.

Network link 2078 typically provides information communication through one or more networks to other devices that use or process the information. For example, network link 2078 may provide a connection through local network 2080 to a host computer 2082 or to equipment 2084 operated by an Internet Service Provider (ISP). ISP equipment 2084 in turn provides data communication services through the public, world-wide packet-switching communication network of networks now commonly referred to as the Internet 2090. A computer called a server 2092 connected to the Internet provides a service in response to information received over the Internet. For example, server 2092 provides information representing video data for presentation at display 2014.

The invention is related to the use of computer system 2000 for implementing the techniques described herein. According to one embodiment of the invention, those techniques are performed by computer system 2000 in response to processor 2002 executing one or more sequences of one or more instructions contained in memory 2004. Such instructions, also called software and program code, may be read into memory 2004 from another computer-readable medium such as storage device 2008. Execution of the sequences of instructions contained in memory 2004 causes processor 2002 to perform the method steps described herein. In alternative embodiments, hardware, such as application specific integrated circuit 2020, may be used in place of or in combination with software to implement the invention. Thus, embodiments of the invention are not limited to any specific combination of hardware and software.

The signals transmitted over network link 2078 and other networks through communications interface 2070, carry information to and from computer system 2000. Computer system 2000 can send and receive information, including program code, through the networks 2080, 2090 among others, through network link 2078 and communications interface 2070. In an example using the Internet 2090, a server 2092 transmits program code for a particular application, requested by a message sent from computer 2000, through Internet 2090, ISP equipment 2084, local network 2080 and communications interface 2070. The received code may be executed by processor 2002 as it is received, or may be stored in storage device 2008 or other non-volatile storage for later execution, or both. In this manner, computer system 2000 may obtain application program code in the form of a signal on a carrier wave.

Various forms of computer readable media may be involved in carrying one or more sequence of instructions or data or both to processor 2002 for execution. For example, instructions and data may initially be carried on a magnetic disk of a remote computer such as host 2082. The remote computer loads the instructions and data into its dynamic memory and sends the instructions and data over a telephone line using a modem. A modem local to the computer system 2000 receives the instructions and data on a telephone line and uses an infra-red transmitter to convert the instructions and data to a signal on an infra-red a carrier wave serving as the network link 2078. An infrared detector serving as communications interface 2070 receives the instructions and data carried in the infrared signal and places information representing the instructions and data onto bus 2010. Bus 2010 carries the information to memory 2004 from which processor 2002 retrieves and executes the instructions using some of the data sent with the instructions. The instructions and data received in memory 2004 may optionally be stored on storage device 2008, either before or after execution by the processor 2002.

FIG. 21 illustrates a chip set 2100 upon which an embodiment of the module 150 may be implemented. Chip set 2100 is programmed to perform one or more steps of a method described herein and includes, for instance, the processor and memory components described with respect to FIG. 20 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2100, or a portion thereof, constitutes a means for performing one or more steps of a method described herein.

In one embodiment, the chip set 2100 includes a communication mechanism such as a bus 2101 for passing information among the components of the chip set 2100. A processor 2103 has connectivity to the bus 2101 to execute instructions and process information stored in, for example, a memory 2105. The processor 2103 may include one or more processing cores with each core configured to perform independently. A multi-core processor enables multiprocessing within a single physical package. Examples of a multi-core processor include two, four, eight, or greater numbers of processing cores. Alternatively, or in addition, the processor 2103 may include one or more microprocessors configured in tandem via the bus 2101 to enable independent execution of instructions, pipelining, and multithreading. The processor 2103 may also be accompanied with one or more specialized components to perform certain processing functions and tasks such as one or more digital signal processors (DSP) 2107, or one or more application-specific integrated circuits (ASIC) 2109. A DSP 2107 typically is configured to process real-world signals (e.g., sound) in real time independently of the processor 2103. Similarly, an ASIC 2109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2103 and accompanying components have connectivity to the memory 2105 via the bus 2101. The memory 2105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 2105 also stores the data associated with or generated by the execution of one or more steps of the methods described herein.

FIG. 22 is a diagram of example components of a mobile terminal 2200 (e.g., cell phone handset) for communications, which is capable of operating in the system of FIG. 1, according to one embodiment. In some embodiments, mobile terminal 2201, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2203, a Digital Signal Processor (DSP) 2205, and a receiver/transmitter unit including a microphone gain control unit and a speaker gain control unit. A main display unit 2207 provides a display to the user in support of various applications and mobile terminal functions that perform or support the steps as described herein. The display 2207 includes display circuitry configured to display at least a portion of a user interface of the mobile terminal (e.g., mobile telephone). Additionally, the display 2207 and display circuitry are configured to facilitate user control of at least some functions of the mobile terminal. An audio function circuitry 2209 includes a microphone 2211 and microphone amplifier that amplifies the speech signal output from the microphone 2211. The amplified speech signal output from the microphone 2211 is fed to a coder/decoder (CODEC) 2213.

A radio section 2215 amplifies power and converts frequency in order to communicate with a base station, which is included in a mobile communication system, via antenna 2217. The power amplifier (PA) 2219 and the transmitter/modulation circuitry are operationally responsive to the MCU 2203, with an output from the PA 2219 coupled to the duplexer 2221 or circulator or antenna switch, as known in the art. The PA 2219 also couples to a battery interface and power control unit 2220.

In use, a user of mobile terminal 2201 speaks into the microphone 2211 and his or her voice along with any detected background noise is converted into an analog voltage. The analog voltage is then converted into a digital signal through the Analog to Digital Converter (ADC) 2223. The control unit 2203 routes the digital signal into the DSP 2205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2225 for compensation of any frequency-dependent impairments that occur during transmission though the air such as phase and amplitude distortion. After equalizing the bit stream, the modulator 2227 combines the signal with a RF signal generated in the RF interface 2229. The modulator 2227 generates a sine wave by way of frequency or phase modulation. In order to prepare the signal for transmission, an up-converter 2231 combines the sine wave output from the modulator 2227 with another sine wave generated by a synthesizer 2233 to achieve the desired frequency of transmission. The signal is then sent through a PA 2219 to increase the signal to an appropriate power level. In practical systems, the PA 2219 acts as a variable gain amplifier whose gain is controlled by the DSP 2205 from information received from a network base station. The signal is then filtered within the duplexer 2221 and optionally sent to an antenna coupler 2235 to match impedances to provide maximum power transfer. Finally, the signal is transmitted via antenna 2217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2201 are received via antenna 2217 and immediately amplified by a low noise amplifier (LNA) 2237. A down-converter 2239 lowers the carrier frequency while the demodulator 2241 strips away the RF leaving only a digital bit stream. The signal then goes through the equalizer 2225 and is processed by the DSP 2205. A Digital to Analog Converter (DAC) 2243 converts the signal and the resulting output is transmitted to the user through the speaker 2245, all under control of a Main Control Unit (MCU) 2203 which can be implemented as a Central Processing Unit (CPU) (not shown).

The MCU 2203 receives various signals including input signals from the keyboard 2247. The keyboard 2247 and/or the MCU 2203 in combination with other user input components (e.g., the microphone 2211) comprise a user interface circuitry for managing user input. The MCU 2203 runs a user interface software to facilitate user control of at least some functions of the mobile terminal 2201 as described herein. The MCU 2203 also delivers a display command and a switch command to the display 2207 and to the speech output switching controller, respectively. Further, the MCU 2203 exchanges information with the DSP 2205 and can access an optionally incorporated SIM card 2249 and a memory 2251. In addition, the MCU 2203 executes various control functions required of the terminal. The DSP 2205 may, depending upon the implementation, perform any of a variety of conventional digital processing functions on the voice signals. Additionally, DSP 2205 determines the background noise level of the local environment from the signals detected by microphone 2211 and sets the gain of microphone 2211 to a level selected to compensate for the natural tendency of the user of the mobile terminal 2201.

The CODEC 2213 includes the ADC 2223 and DAC 2243. The memory 2251 stores various data including call incoming tone data and is capable of storing other data including music data received via, e.g., the global Internet. The software module could reside in RAM memory, flash memory, registers, or any other form of writable storage medium known in the art. The memory device 2251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2249 carries, for instance, important information, such as the cellular phone number, the carrier supplying service, subscription details, and security information. The SIM card 2249 serves primarily to identify the mobile terminal 2201 on a radio network. The card 2249 also contains a memory for storing a personal telephone number registry, text messages, and user specific mobile terminal settings.

In some embodiments, the mobile terminal 2201 includes a digital camera comprising an array of optical detectors, such as charge coupled device (CCD) array 2265. The output of the array is image data that is transferred to the MCU for further processing or storage in the memory 2251 or both. In the illustrated embodiment, the light impinges on the optical array through a lens 2263, such as a pin-hole lens or a material lens made of an optical grade glass or plastic material. In the illustrated embodiment, the mobile terminal 2201 includes a light source 2261, such as a LED to illuminate a subject for capture by the optical array, e.g., CCD 2265. The light source is powered by the battery interface and power control module 2220 and controlled by the MCU 2203 based on instructions stored or loaded into the MCU 2203.

4. Alternatives, Improvements and Modifications

Figure 23:
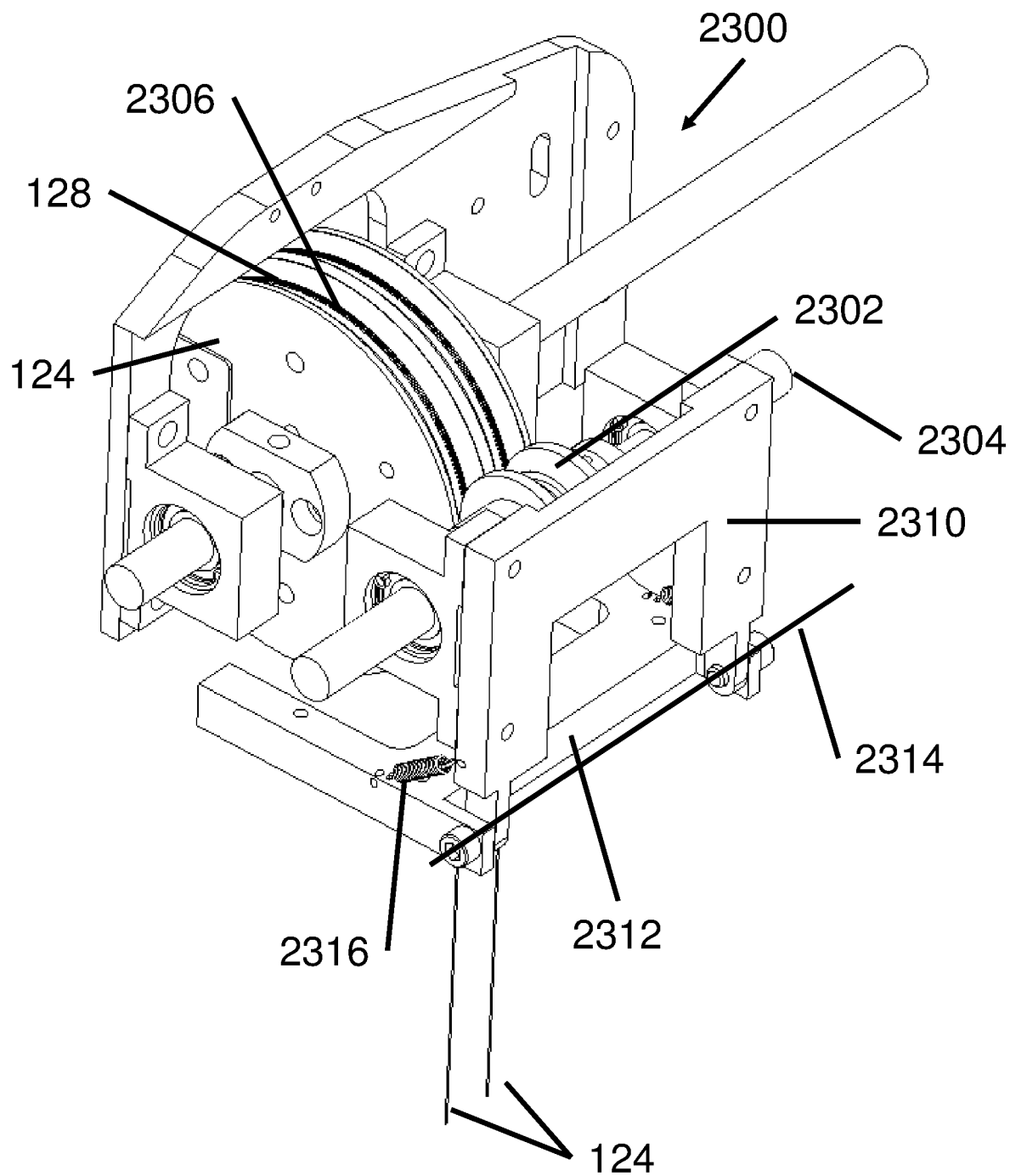
FIG. 23 is a perspective diagram of an example of a drum arrangement according to an alternate embodiment.
Figure 24:
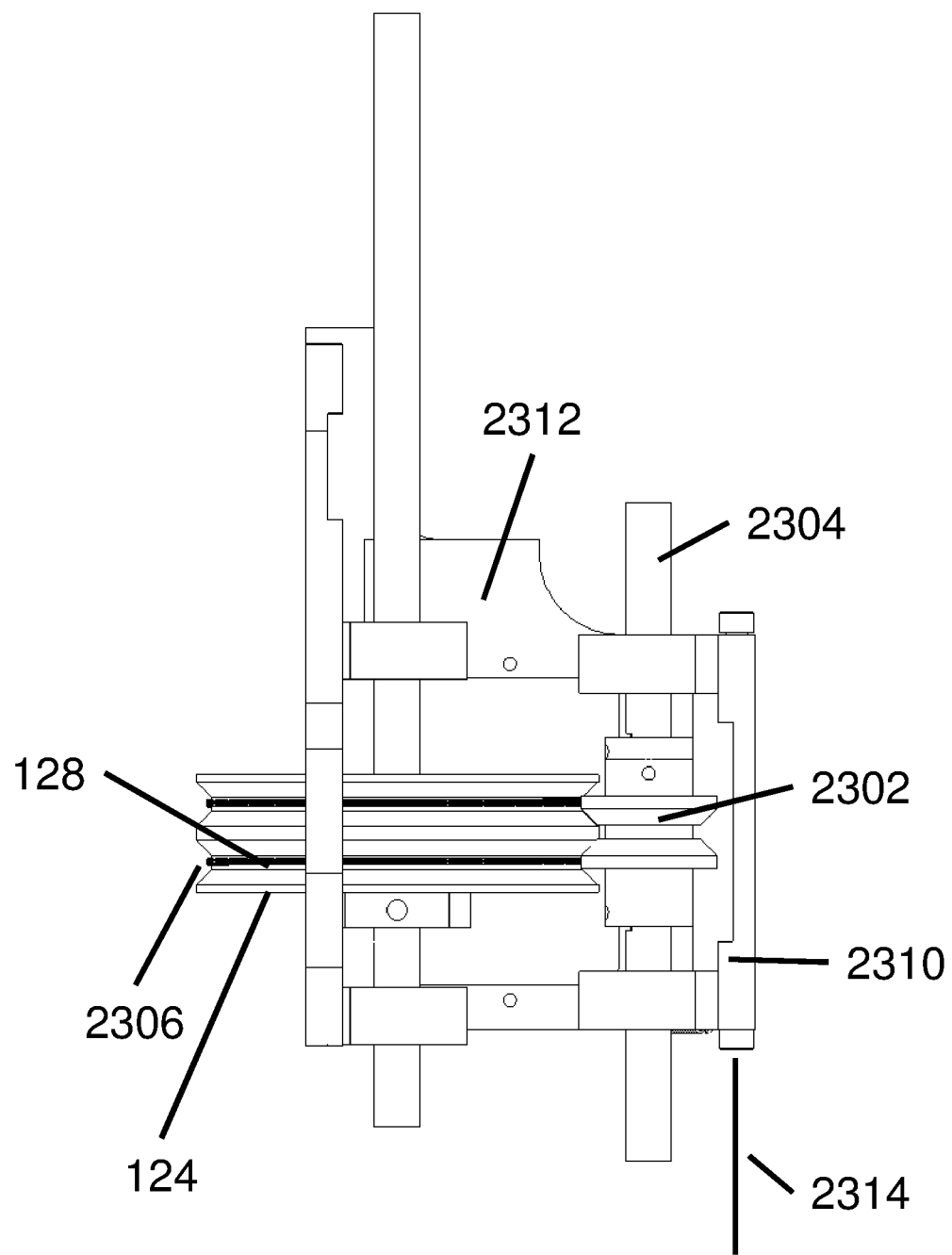
FIG. 24 is a top view diagram of the drum arrangement of FIG. 23.
Figure 25:
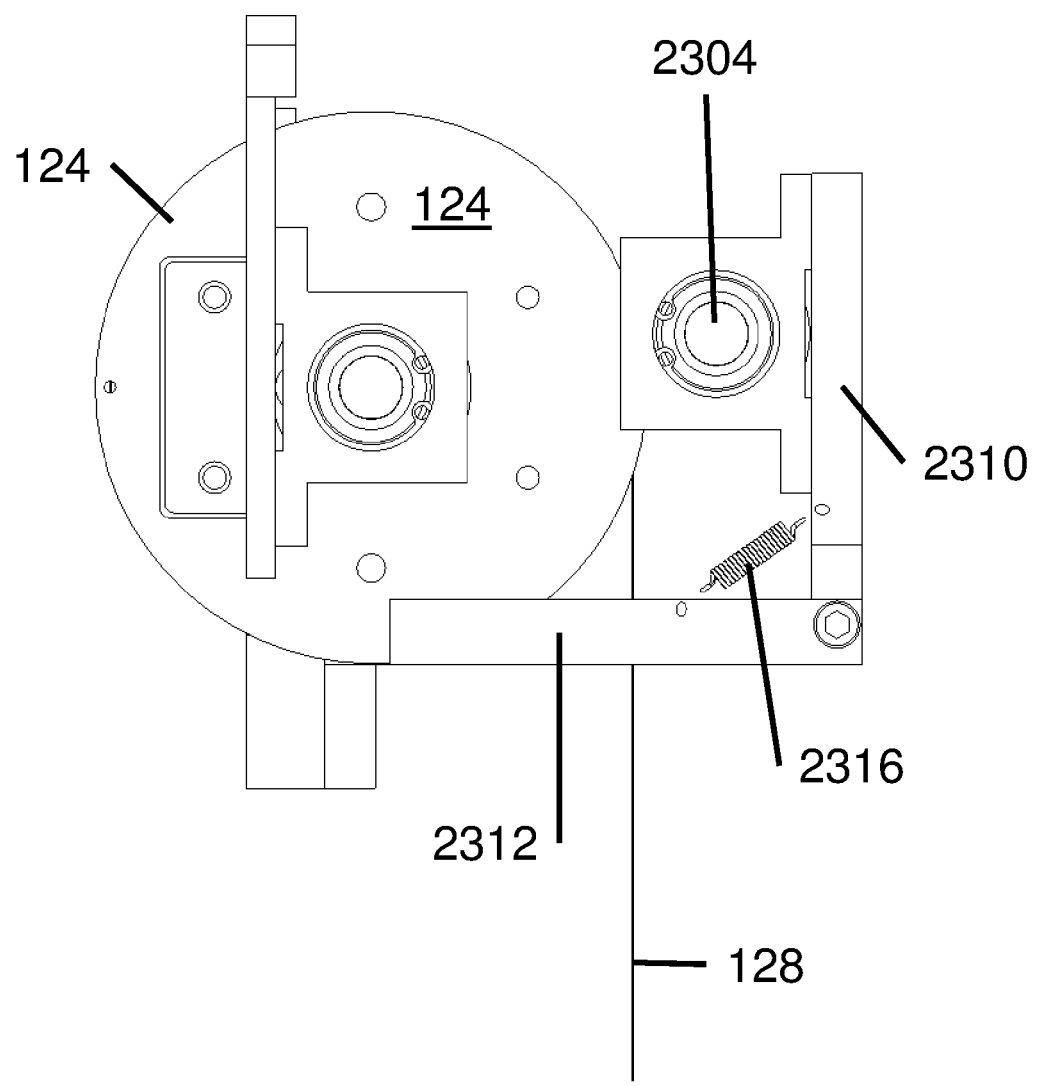
FIG. 25 is a side view diagram of the drum arrangement of FIG. 23.

FIG. 23 is a perspective diagram of an example of a drum arrangement 2300 according to an alternate embodiment. FIG. 24 is a top view diagram of the drum arrangement 2300 of FIG. 23. FIG. 25 is a side view diagram of the drum arrangement of FIG. 23. As can be seen in FIG. 23 through FIG. 25, a counter drum 2302 disposed on a counter drum shaft 2304 protrudes into a groove 2306 of the drum 124 and rotates with the drum 124 while holding the wire 128 tightly against the drum 124. The counter drum 2302 and counter drum shaft 2304 are mounted to a counter drum plate 2310 which is rotatably secured to a counter drum mounting bracket 2312. The counter drum plate 2310 rotates about a rotation axis 2314 and is held against the drum 124 by a resilient member 2316. An example resilient member 2316 is a counter drum coil spring secured in tension to the counter drum plate 2310 and to the counter drum mounting bracket 2312. The resilience of the resilient member keeps the counter drum 2302 pressed against the wire 128. Two grooves 2306 and wires 128 are shown, but any number will suffice. This arrangement ensures the wires(s) 128 remain in the groove(s) 2306. Example wire is stainless steel, 0.005 inches in diameter. Hence, when the wire 128 is unwound such that great lengths are suspended from the drum 124, a resilience of the wire can cause it to jump from the groove 2306 during operation.

Figure 26:
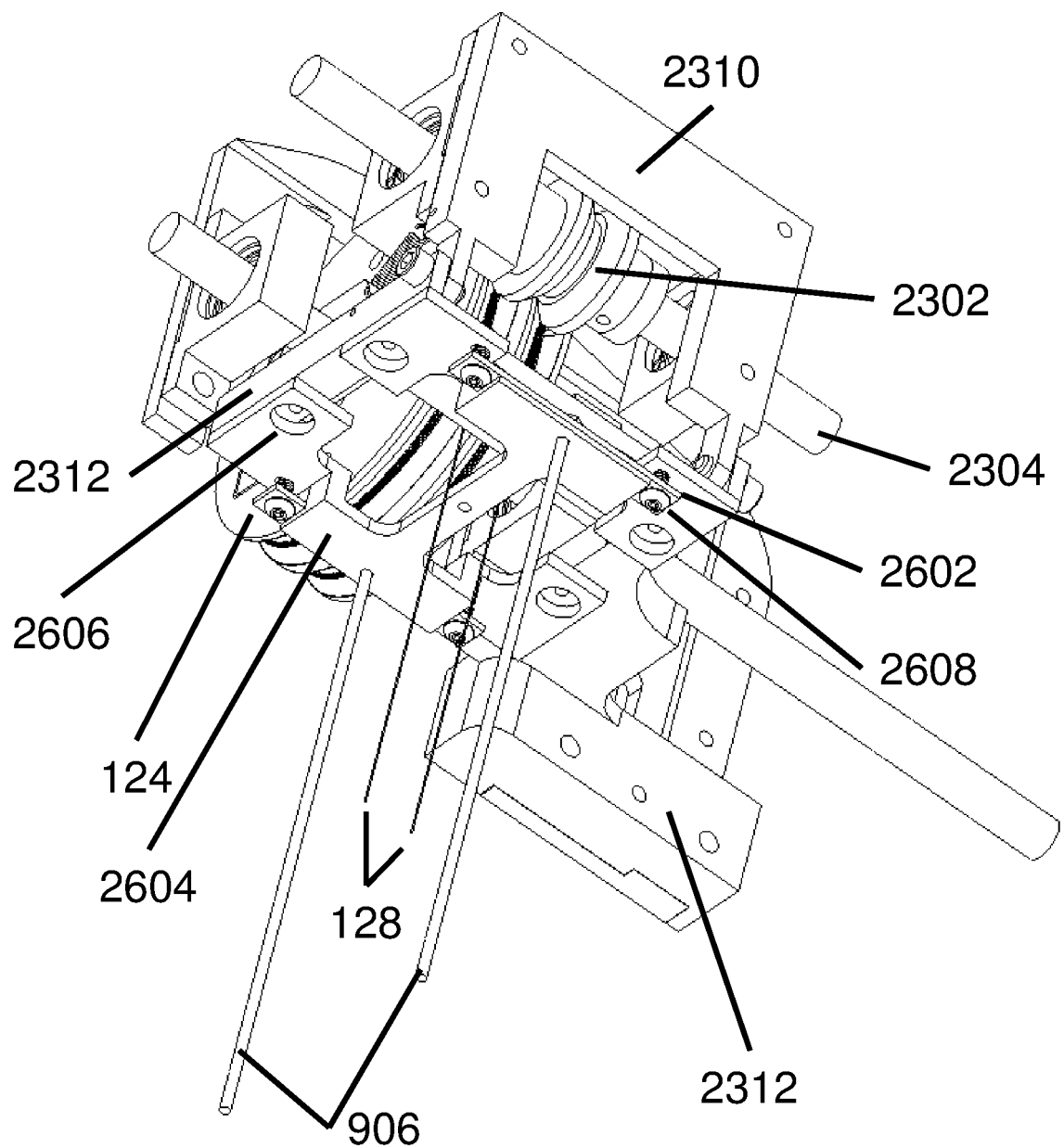
FIG. 26 is a bottom perspective diagram of a guide rail arrangement.
Figure 27:
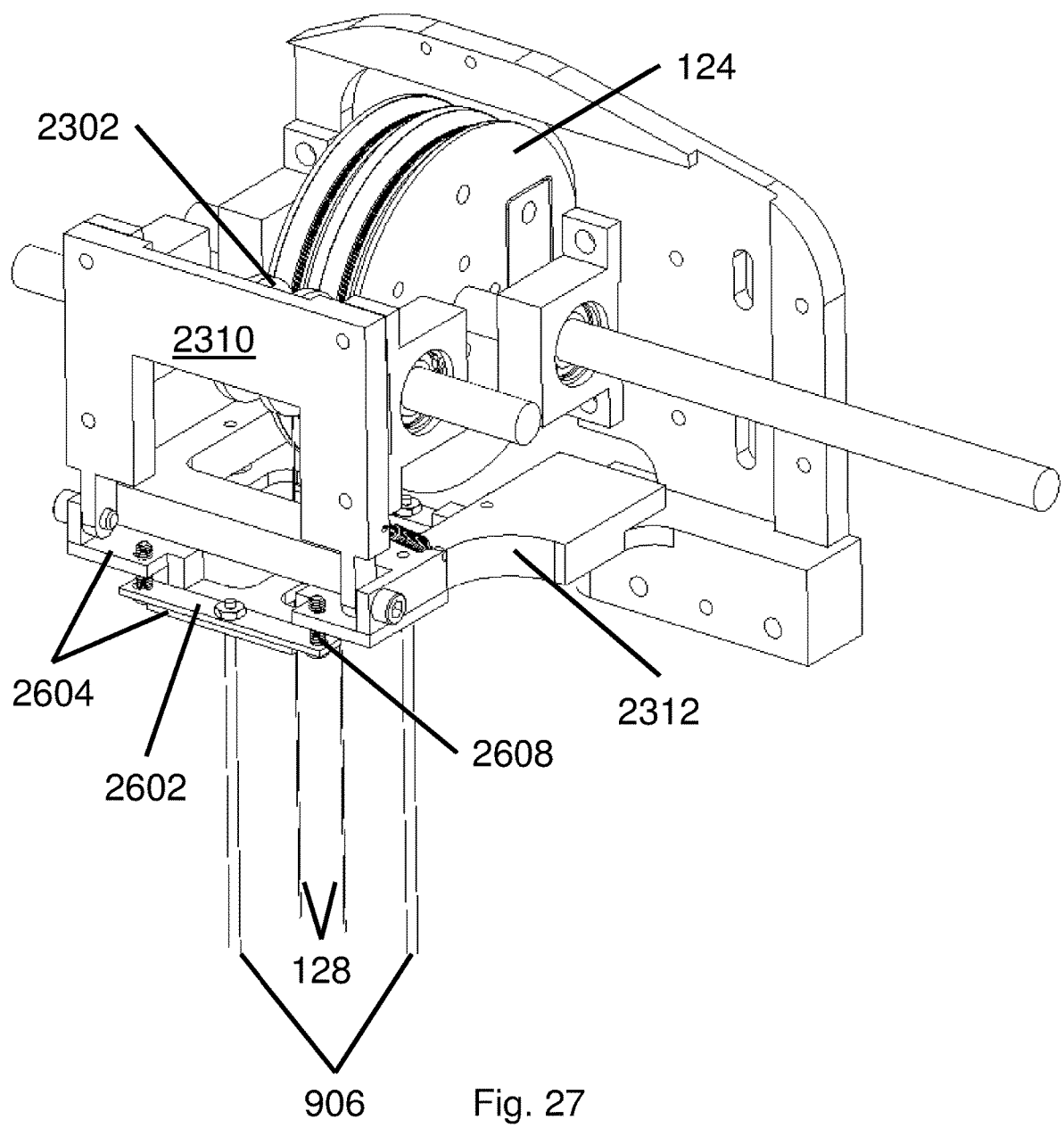
FIG. 27 is a top perspective diagram of the guide rail arrangement of FIG. 26.

FIG. 26 is a bottom perspective diagram of a guide rail arrangement 2600 used to adjust and secure the guide rails 906. FIG. 27 is a top perspective diagram of the guide rail arrangement 2600 of FIG. 26. As can be seen in FIG. 26 and FIG. 27, each guide rail 906 is secured to a respective lifting beam 2602. The lifting beam 2602, is adjustably secured to a guide rail mounting plate 2604 which is, in turn, adjustably mounted to the counter drum mounting bracket 2312. Each lifting beam 2602 is vertically adjustable and the vertical adjustment is effective to set a proper tension in the associated guide rail 906. The vertical adjustment can be effected in a variety of ways known to the Artisan. In the example shown, the vertical adjustment is achieved using threaded fasteners 2608 between the lifting beam 2602 and the guide rail mounting plate 2604. The guide rail mounting plate 2604 is horizontally/laterally adjustable to ensure the guide rails 906 remain straight/vertical. The guide rail mounting plate 2604 is secured to the counter drum mounting bracket 2312 with a fastener (not shown). The lateral adjustment is accomplished by using an oversize hole 2606 for the fastener in the guide rail mounting plate 2604, and optionally a washer. The oversize hole 2606 permits the guide rail mounting plate 2604 to be properly laterally positioned despite the fastener already being disposed in the oversized hole 2606. Once in the proper lateral position, the fastener is simply tightened. Hence, the fastener might not be centered in the oversize hole 2606 when the guide rail mounting plate 2604 is properly laterally positioned. The two guide wires 906 move with the guide rail mounting plate 2604 because they are secured to the guide rail mounting plate 2604 via the threaded fasteners 2608. Also, in this embodiment the two guide wires 906 pass through the guide rail mounting plate 2604 before reaching the lifting beam 2602. Hence, the guide rail mounting plate 2604 pushes on the sides of the guide rails 906 to laterally position the guide rails 906. The two guide wires 906 also move in unison with each other when the guide rail mounting plate 2604 is embodied as a single element. This simplifies the adjustment of the guide rails 906. However, the guide rail mounting plate 2604 need not necessarily be a single element.

Figure 28:
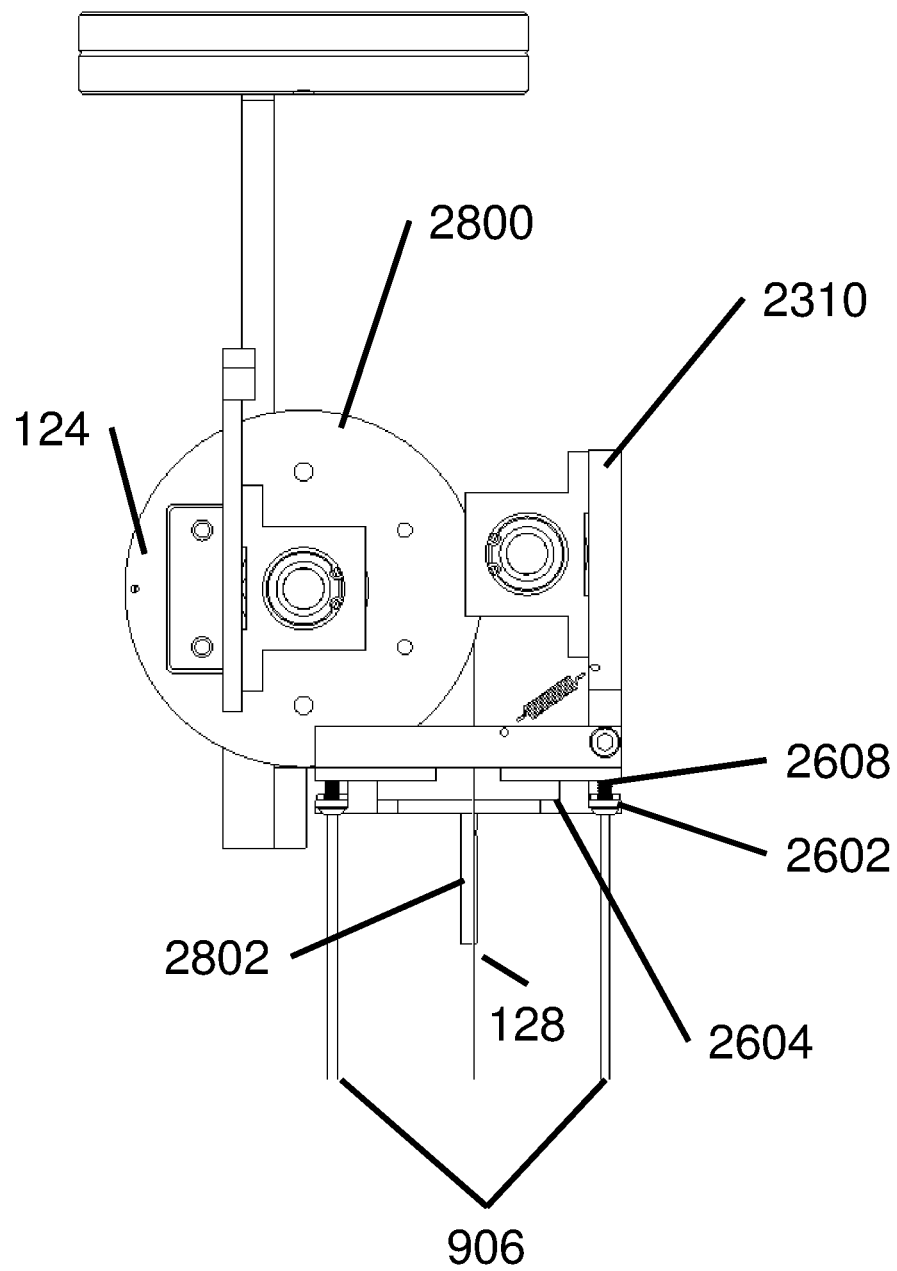
FIG. 28 is a side view diagram of an example of the drum arrangement according to an alternate embodiment.

FIG. 28 is a side view diagram of an example of the drum arrangement 2800 according to an alternate embodiment. In this example, a plunger 2802 extends downward from the guide rail mounting plate 2604 and is centered between the guide rails 906. The example position relative to the guide rails 906 is not required, however, so long as the plunger cooperates with an alternate embodiment of the tool holder in accord with the principles disclosed below.

Figure 29:
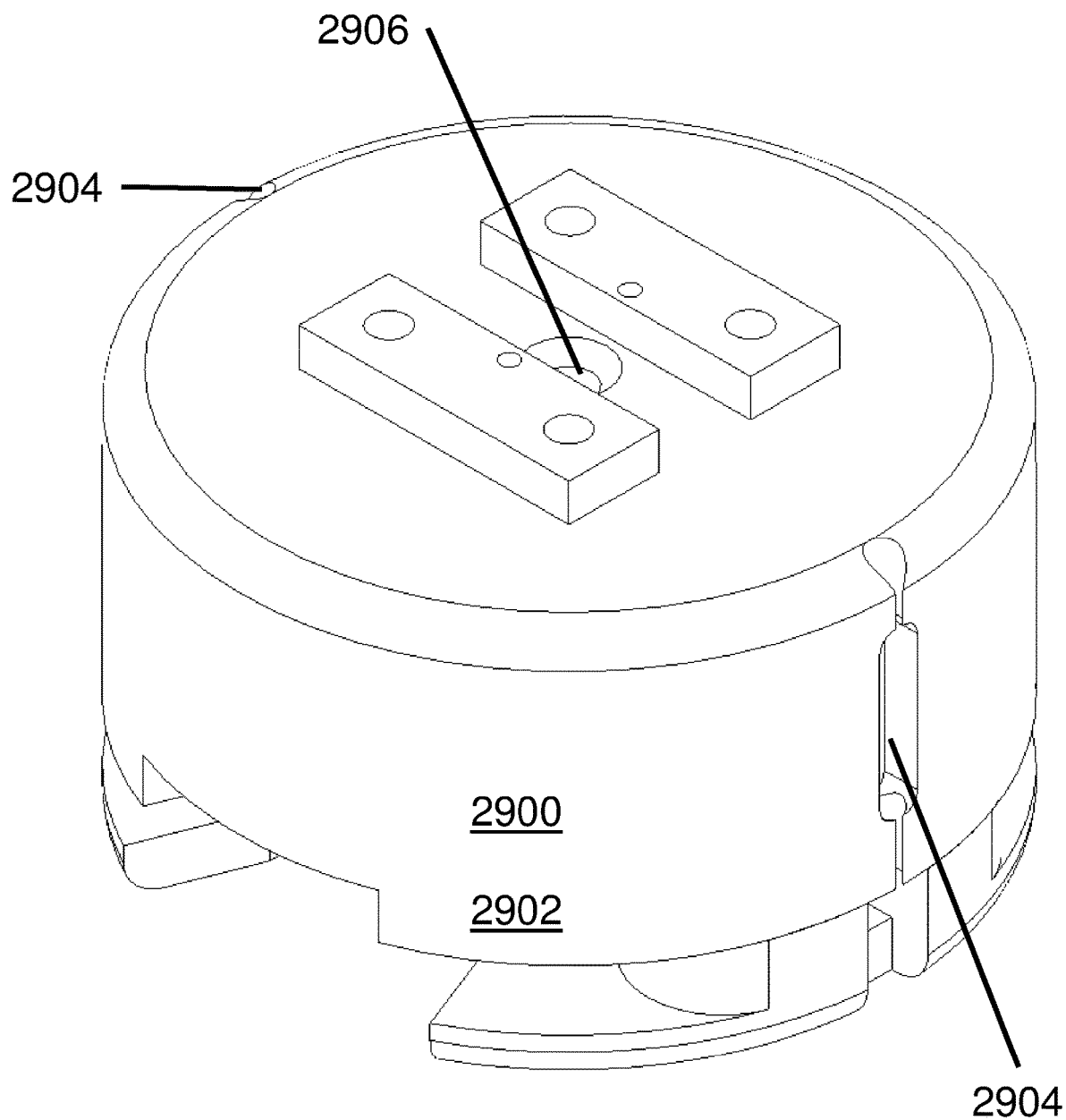
FIG. 29 is a perspective diagram of an example of the tool holder according to an alternate embodiment.
Figure 30:
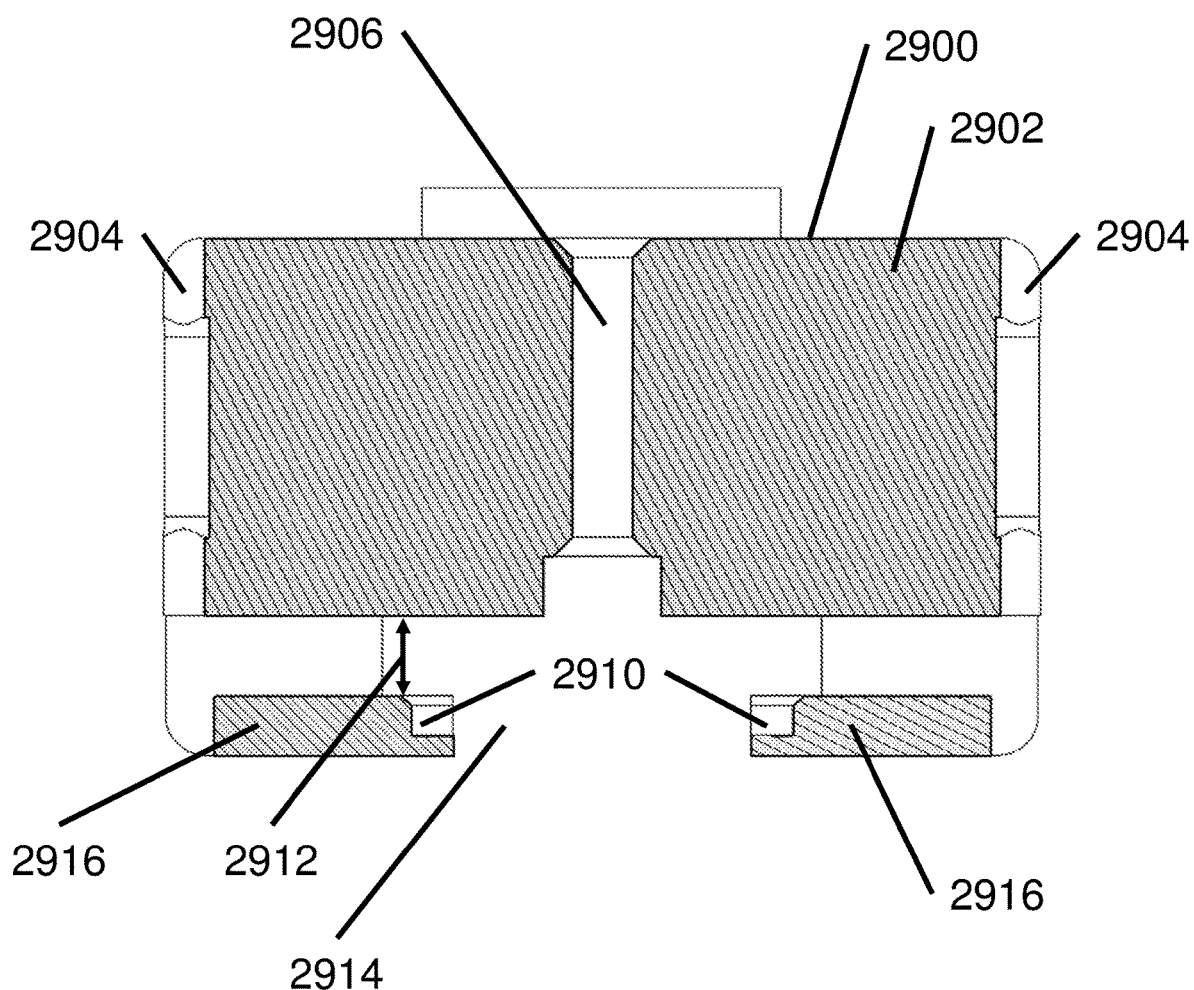
FIG. 30 is a cross sectional side view diagram of the tool holder of FIG. 29.

FIG. 29 is a perspective diagram of an example of the tool holder 2900 according to an alternate embodiment. FIG. 30 is a cross sectional side view diagram of the tool holder 2900 of FIG. 29. As can be seen from FIG. 29 and FIG. 30, the tool holder includes the body 2902 with the grooves 2904. The body 2902 is likewise a mass suitable to stabilize the raising and lowering action. However, in this embodiment, the body 2902 includes a through-hole 2906 configured to receive the plunger 2802. To reset a returning tool, the tool holder 2900 is raised toward its highest position under the drum arrangement 2800. The plunger 2802 passes through the through-hole 2906 of the tool holder 2900 and protrudes toward a tool being held in the cradle 2910. In this example, the gap 2912 is much smaller, and there is no door in the way. Hence, the plunger 2802 can readily reach the upper portion of the floating element as the tool holder 2900 is raised. The plunger 2802 pushes the upper portion of the floating element of the tool down as the tool holder 2900 is raised further, and this resets the tool. In an example embodiment, the upper portion of the floating element may extend into the through-hole 2906 of the tool holder 2900 as the tool is being raised (e.g. after having been tripped). This engagement between the upper portion of the floating element and the through-hole 2906 secures the tool into the tool holder 2900. An advantage of resetting the tool in this manner is that more resetting force can be exerted by the plunger 2802 than can be exerted by just the weight of the tool holder 2900. Moreover, there is no risk of tilting and perhaps binding the tool holder 2900 if the tool holder 2900 is not properly centered during the resetting operation using only the weight of the tool holder 2900.

In this embodiment, the slot 2914 in the tool holder 2900 extends fully through the foot 2916 so the tool can enter the tool holder 2900 from either side to be lowered into the cradle 2910.

Figure 31:
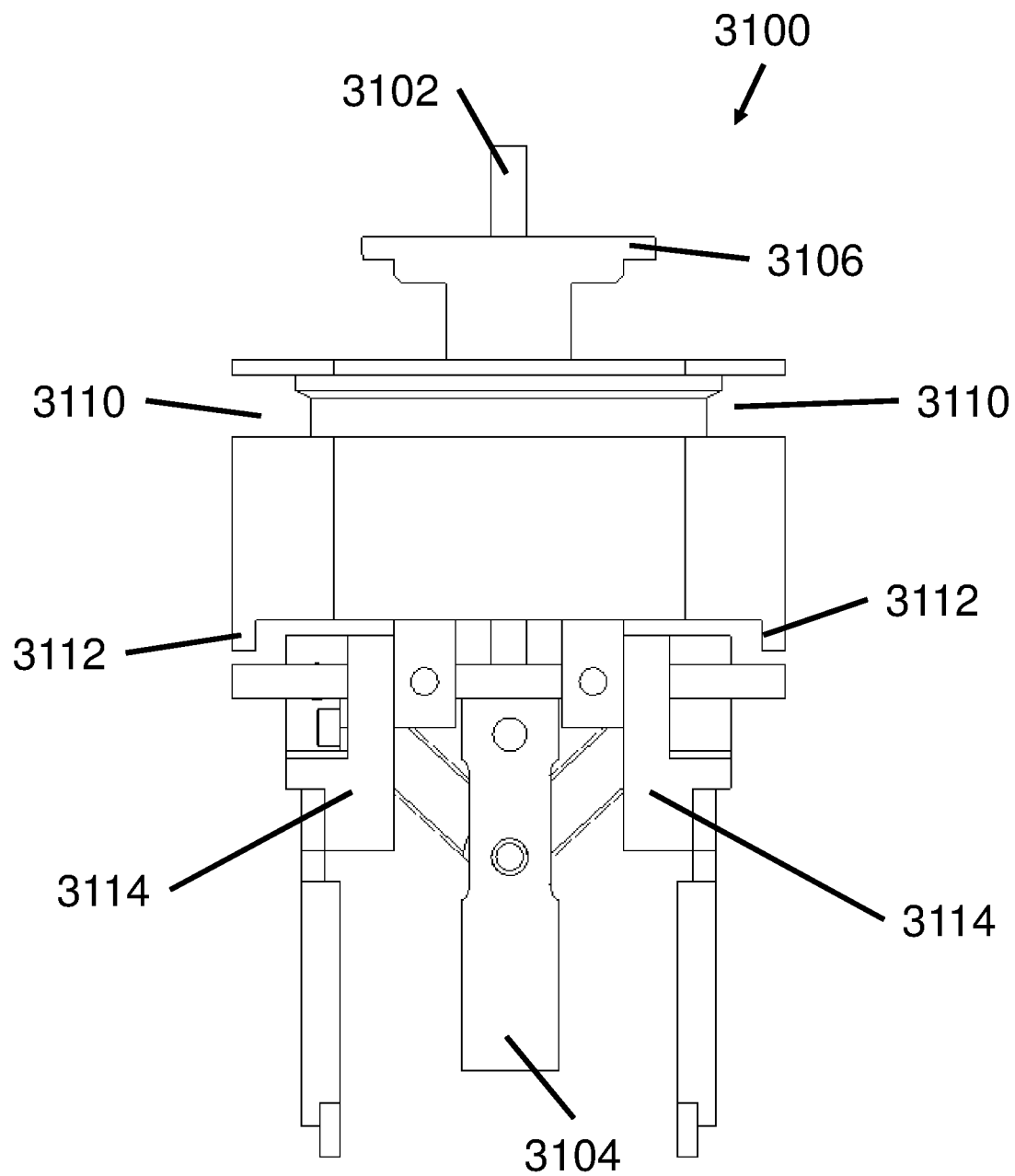
FIG. 31 is a side view diagram of an example of the drop-off tool according to an alternate embodiment.
Figure 32:
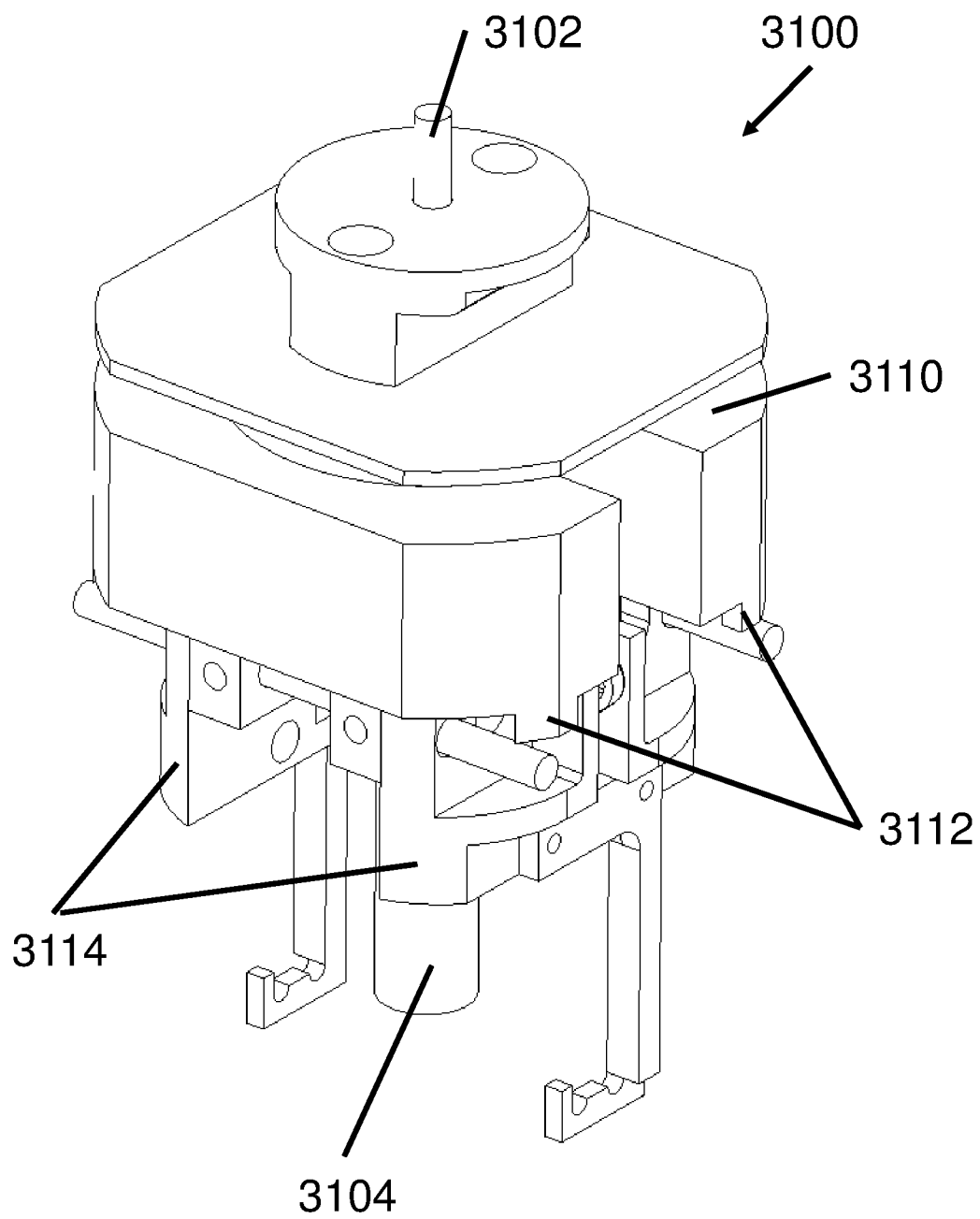
FIG. 32 is a perspective diagram of the drop-off tool of FIG. 31.

FIG. 31 is a side view diagram of an example of the drop-off tool 3100 according to an alternate embodiment. FIG. 32 is a perspective diagram of the drop-off tool 3100 of FIG. 31. As can be seen in FIG. 31 and FIG. 32, the upper portion 3102 of the floating element 3104 protrudes upward from the handle 3106 when the floating element 3104 is in the lower (e.g. untripped) position shown. The upper portion 3102 is sized so it and the handle 3106 fit into the gap 2912 in the tool holder 2900 when the floating element 3104 is in the lower/untripped position. When the drop-off tool 3100 drops off the object 290 and is tripped, the upper portion 3102 will mover farther upward, and optionally enter the through-hole 2906 of the tool holder 2900. The tool holder 2900 will be raised toward the drum arrangement 2300 until the plunger 2802 reaches through the through-hole 2906 of the tool holder 2900 and pushes the upper portion 3102 downward, thereby resetting the tool.

In lieu of a holding plate, the drop-off tool 3100 includes a groove 3110 configured to receive forks of an alternate example tool holder (discussed below). In addition, the drop-off tool 3100 includes a stopper 3112 that prevents the sliding blocks 3114 from sliding off the guide rods 3116 during operation.

Although the drop-off tool 3100 is discussed here, an embodiment of the pick-up tool operates under the same principles discussed for this embodiment of the drop-off tool 3100.

Figure 33:
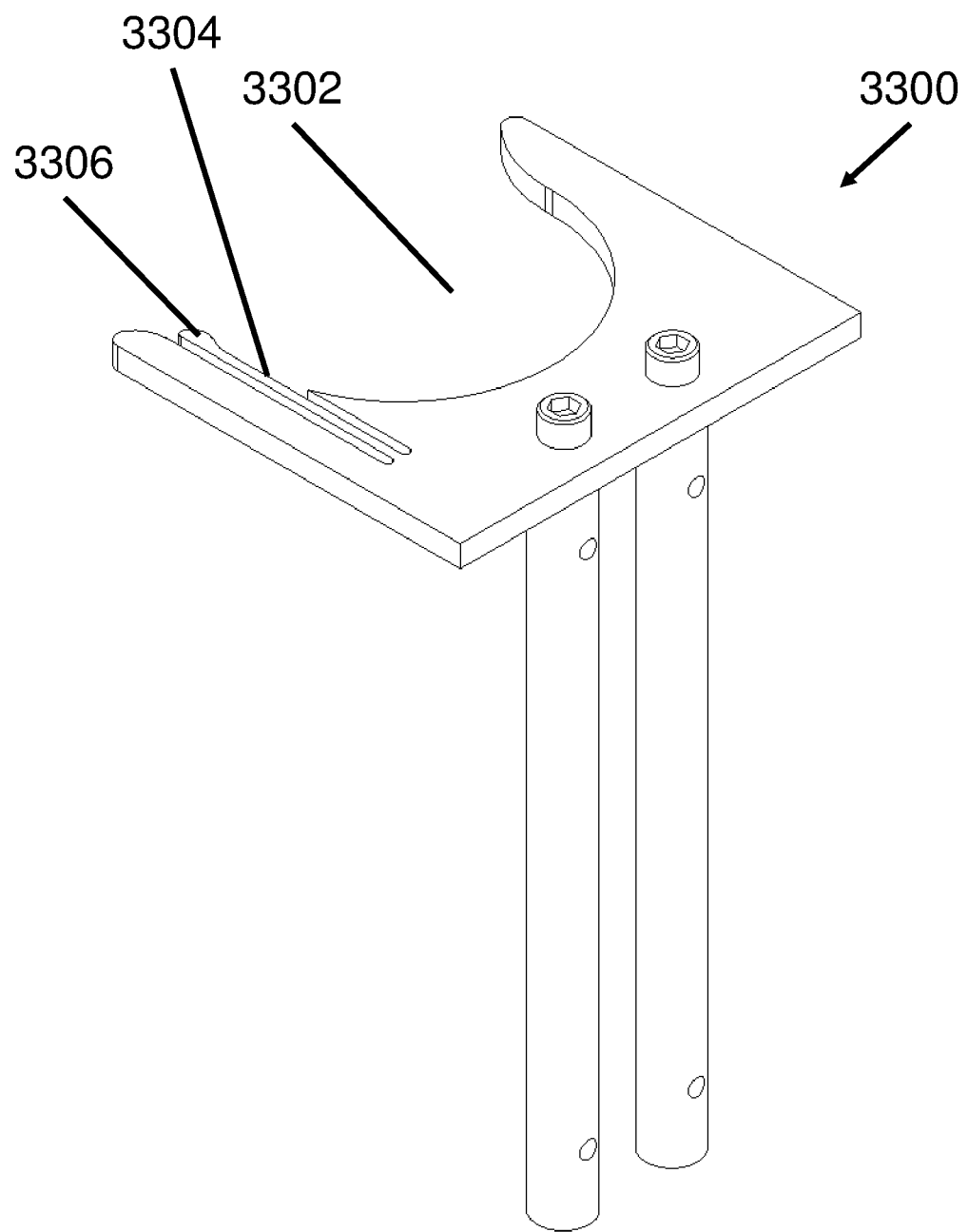
FIG. 33 is a perspective diagram of an example of the tool holder according to an alternate embodiment.

FIG. 33 is a perspective diagram of an example of the tool holder 3300 according to an alternate embodiment. The tool holder 3300 includes a recess 3302 configured to accept the groove 3110 of the drop-off tool 3100 or of the pickup tool. A securing prong 3304 with a locking tab 3306 cooperates with the shape of the groove 3110 to hold the tool in the recess 3302.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A system for transferring objects into a device inside a controlled environment, comprising:
    a winch comprising a drum and wire arrangement configured to be reversibly wound onto the drum by a first drive; and a tool suspended below a distal end of the wire arrangement and configured to suspend an object therefrom, wherein both the tool and the object are sized to fit inside a device located below the winch; and a carousel connected to a second drive configured to rotate the carousel around a vertical axis, the carousel comprising a storage space centered at a first horizontal angle and a pass-through opening at a different second horizontal angle, wherein the carousel is configured to selectively position the storage space and the pass-through opening under the tool by rotating around the vertical axis, wherein the pass-through opening is large enough to pass the tool and the object suspended from the wire arrangement therethrough as the wire arrangement is unwound from the drum and the tool and the object are thereby lowered relative to the carousel into the device.

2. The system as recited in claim 1, wherein the wire arrangement comprises plural wires.

3. The system as recited in claim 1, wherein:

the wire arrangement comprises sufficient length to pass an object suspended from the tool entirely into the portion of the controlled environment disposed inside the device; and a maximum distance from a top of the drum to a bottom of the carousel is less than an overall height of the device.

4. The system as recited in claim 1, further comprising a coupler configured to suspend the tool therefrom, the coupler attached to the distal end of the wire arrangement and selectively detachable from the tool.

5. The system as recited in claim 1, further comprising an object holder configured to suspend the object therefrom, the object holder attached to a deck of the carousel at the storage space and configured to rotate about the vertical axis with the carousel.

6. The system as recited in claim 1, further comprising a tool holder configured to suspend the tool therefrom, the tool holder attached to a deck of the carousel at the storage space and configured to rotate about the vertical axis with the carousel.

7. The system as recited in claim 1, further comprising a chamber configured to generate a controlled environment therein;

wherein the system is wholly contained inside the chamber.

8. The system as recited in claim 7, wherein the controlled environment comprises a vacuum environment.

* * * * *